(12) United States Patent
Chapman

(10) Patent No.: US 12,486,911 B2
(45) Date of Patent: Dec. 2, 2025

(54) ROTARY DISC VALVE

(71) Applicant: Robert Bosch GmbH, Stuttgart (DE)

(72) Inventor: Thomas Chapman, Templeton, MA (US)

(73) Assignee: Robert Bosch GmbH, Stuttgart (DE)

( * ) Notice: Subject to any disclaimer, the term of this patent is extended or adjusted under 35 U.S.C. 154(b) by 65 days.

(21) Appl. No.: 18/630,442

(22) Filed: Apr. 9, 2024

(65) Prior Publication Data

US 2025/0314313 A1 Oct. 9, 2025

(51) Int. Cl.
F16K 11/074 (2006.01)

(52) U.S. Cl.
CPC ......... *F16K 11/074* (2013.01); *F16K 11/0743* (2013.01); *Y10T 137/86863* (2015.04)

(58) Field of Classification Search
CPC .......................... F16K 11/074; F16K 11/0743
See application file for complete search history.

(56) References Cited

U.S. PATENT DOCUMENTS

| | | | |
|---|---|---|---|
| 2,675,830 A * | 4/1954 | Vuillemin | F16K 11/074 137/625.21 |
| 5,950,576 A | 9/1999 | Busato et al. | |
| 6,085,788 A | 7/2000 | Larson et al. | |
| 6,186,174 B1 * | 2/2001 | Yurchision | F16K 3/10 137/625.46 |
| 6,253,402 B1 * | 7/2001 | Lin | F16K 11/074 137/625.21 |
| 10,344,877 B2 | 7/2019 | Roche et al. | |
| 11,932,078 B2 | 3/2024 | Pinto et al. | |
| 2008/0258093 A1 | 10/2008 | Shay et al. | |
| 2010/0059425 A1 | 3/2010 | Roig | |
| 2017/0152956 A1 * | 6/2017 | Sansum | F16K 31/60 |
| 2022/0390025 A1 * | 12/2022 | Chapman | F16K 27/06 |
| 2022/0390027 A1 * | 12/2022 | Chapman | F16K 11/0743 |
| 2023/0184338 A1 * | 6/2023 | Chapman | F16K 11/0743 137/119.04 |
| 2023/0193906 A1 * | 6/2023 | Chapman | F16K 11/074 123/450 |
| 2024/0003436 A1 * | 1/2024 | Chapman | F01P 7/14 |
| 2024/0344620 A1 * | 10/2024 | Chen | B60K 11/02 |
| 2024/0410477 A1 * | 12/2024 | Lei | F16K 11/074 |

* cited by examiner

Primary Examiner — Robert K Arundale
(74) Attorney, Agent, or Firm — Kelly McGlashen

(57) ABSTRACT

A rotary disc valve includes a valve housing. The housing includes a valve body having multiple ports and a lid that closes one end of the valve body. In addition, the valve may include a diverter and seal assembly disposed in the housing, the seal assembly providing a seal between the diverter and the valve body. In at least one rotational orientation of the diverter, the diverter is configured to divert fluid flow circumferentially along a first circumferential fluid path portion between a first subchamber and a second subchamber disposed between the rotational axis and the sidewall and divert fluid flow circumferentially along a second circumferential fluid path portion between a third subchamber and a fourth subchamber disposed between the rotational axis and the sidewall. The second circumferential fluid path portion is disposed radially outward with respect to the first circumferential fluid path portion.

20 Claims, 18 Drawing Sheets

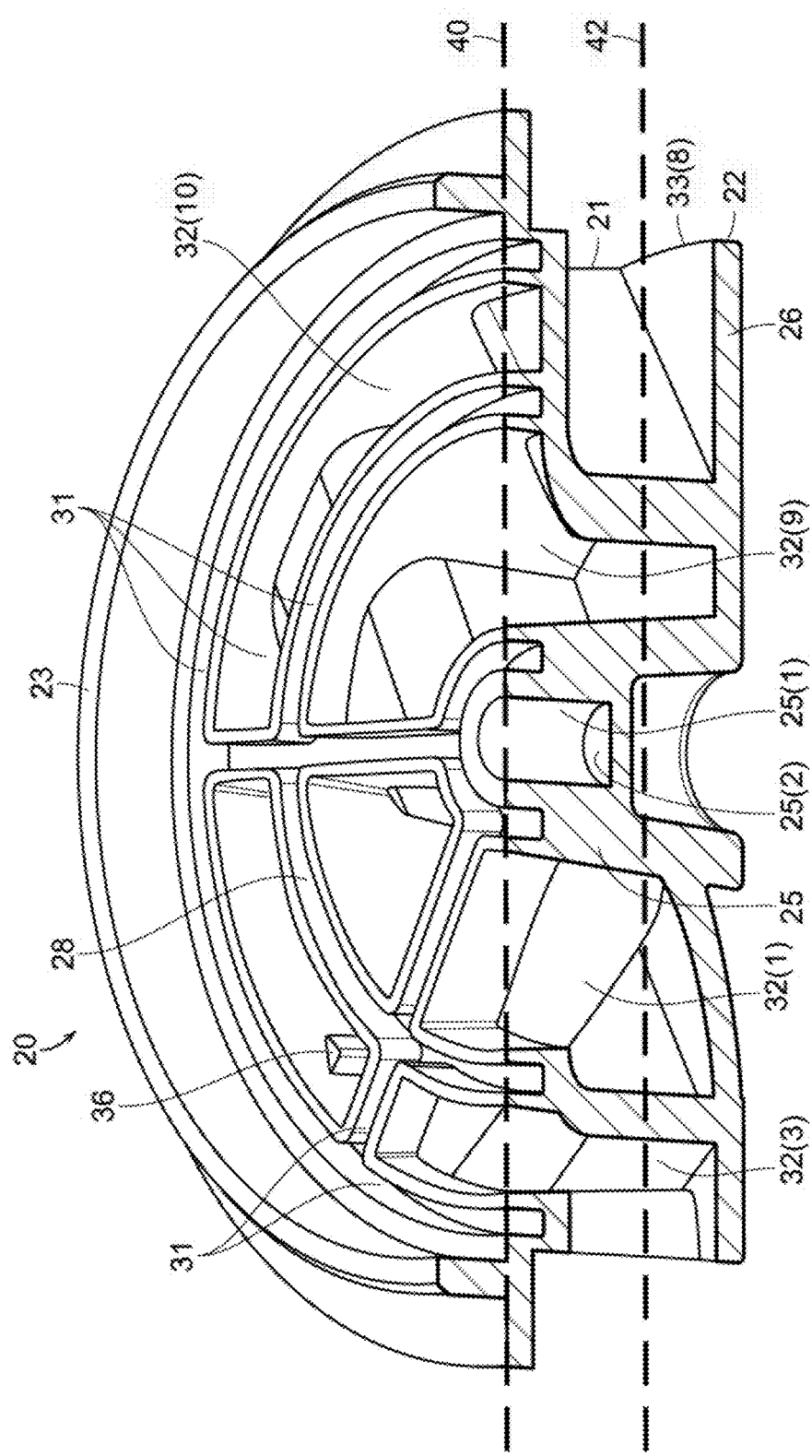

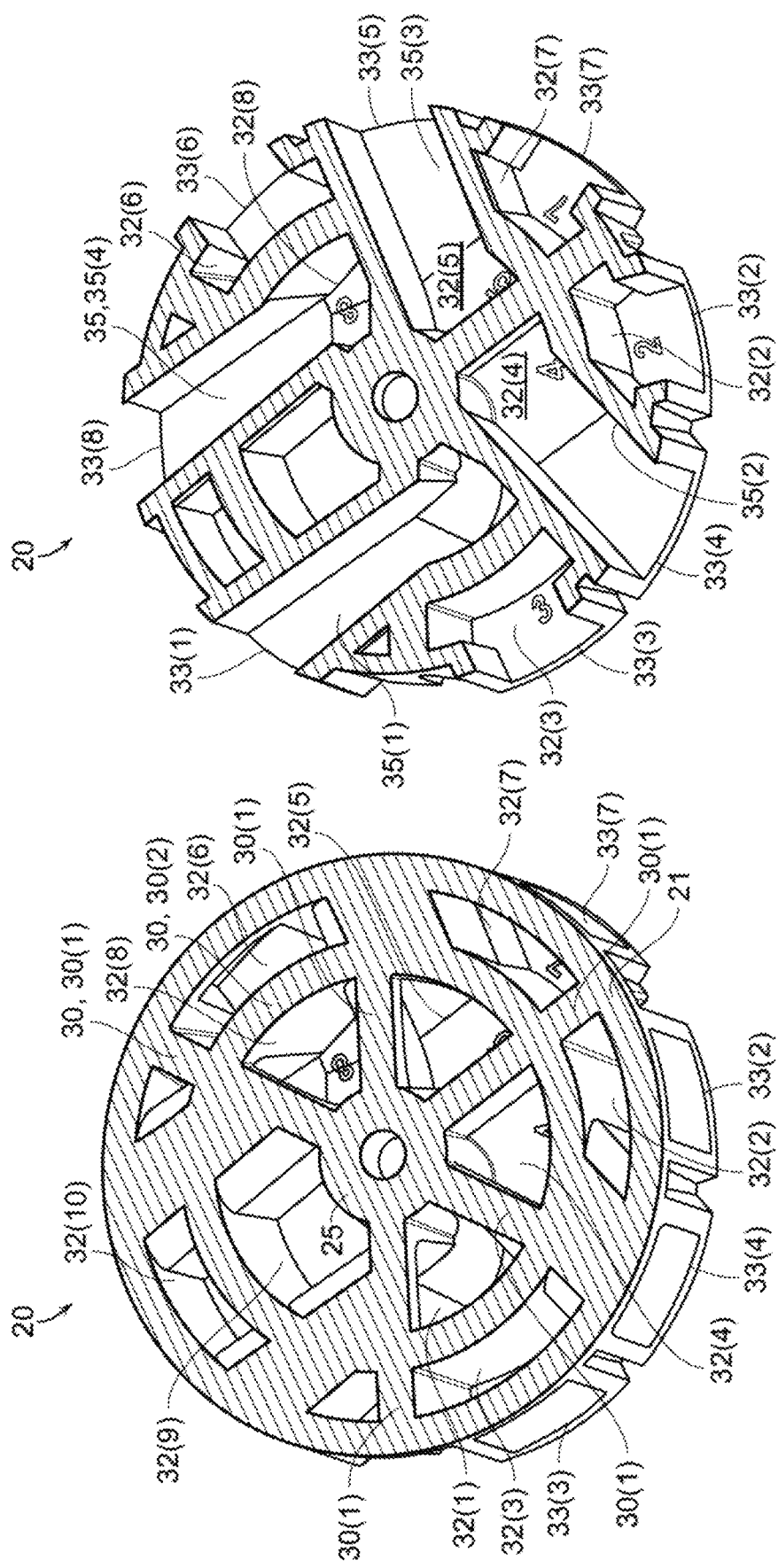

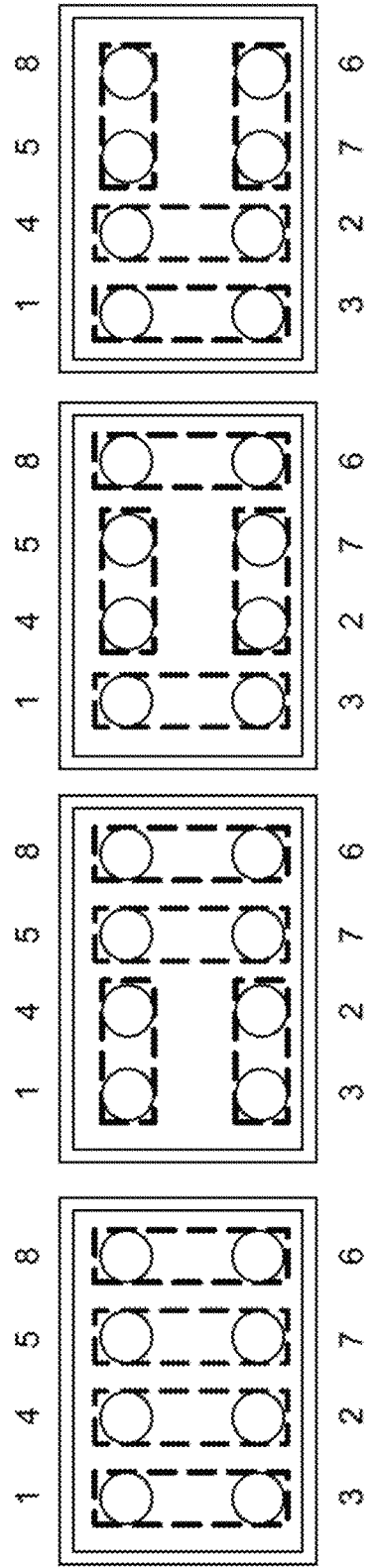
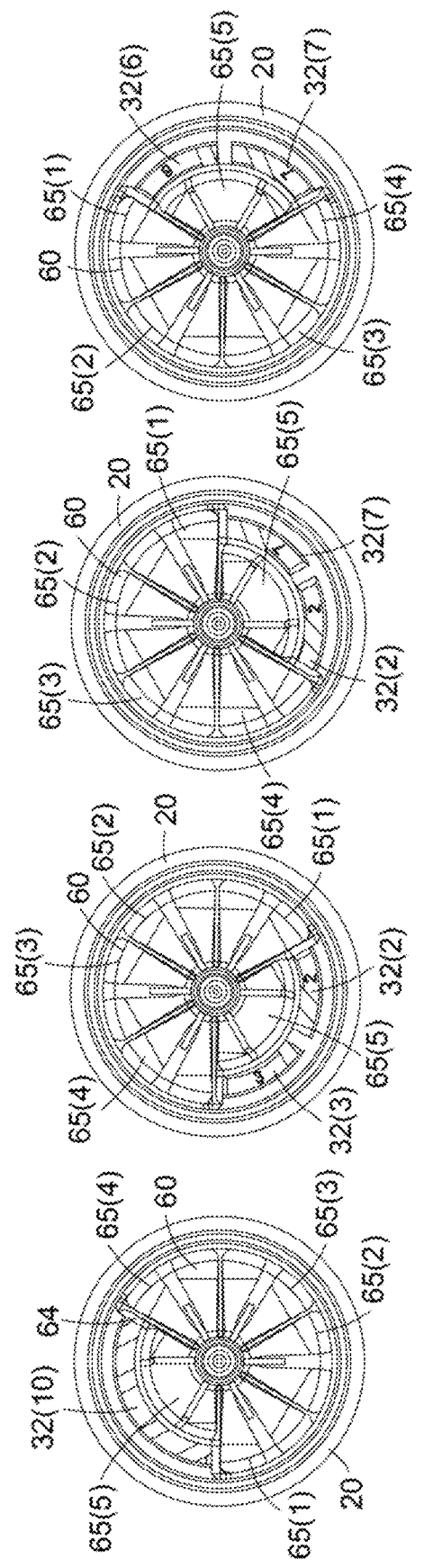

ROTARY DISC VALVE

BACKGROUND

Electric vehicles require thermal management of various vehicle components, including electric drive motors, batteries, autonomous driving computers, passenger cabin, etc. The thermal management of the various vehicle components is achieved by efficient use of the thermal energy found within several coolant loops provided within the vehicle. Distribution of the thermal energy is achieved by use of coolant valves and pumps that move automotive coolant to and between the various vehicle components via the coolant loops. The thermal management system of electric vehicles is complex due to the number of vehicle components to be cooled, which in turn requires multiple coolant loops and corresponding multiple sets of pumps and coolant valves. It is desirable to reduce the complexity of vehicle thermal management systems in order to increase efficiency, reduce system costs and improve system reliability.

SUMMARY

A single multi-port rotary disc valve may be used, for example, to distribute automotive coolant through the various coolant loops within a vehicle. The multi-port nature of the rotary disc valve allows a single valve-and-actuator assembly to perform the switching of multiple coolant streams, typically the job of more than one valve. The term "multi-port valve" as used herein refers to a valve that has more than three ports, and that controls the flow through more than one coolant path.

Unlike some conventional multi-port valves, the multi-port rotary disc valve described herein utilizes flat discs referred to as "seal plates" as the sealing elements. The term "rotary disc valve" as used herein refers to a valve in which fluid-tight sealing is provided between planar surfaces of adjacent seal plates. To this end, the rotary disc valve includes a disc-type diverter that is disposed in the valve body and is rotatable relative to the valve body about a rotational axis. The rotational axis is perpendicular or substantially perpendicular to the plane in which the ports reside. The term "substantially perpendicular" as used herein indicates that small angular deviations, for example in a range of +/−3 degrees from perpendicular, are within acceptable tolerance.

The diverter is generally disc shaped and includes an outer surface from which a shaft protrudes. The diverter is configured to control fluid flow through the valve body in such a way that fluid enters the diverter in a first direction that is parallel to the shaft rotational axis. Fluid exits the diverter in a second direction that is parallel to the rotational axis, the second direction being opposite the first direction.

Seal assemblies that employ seal plates require few highly toleranced parts to achieve the required sealing function. This disc design configuration also requires less torque to turn, allowing the use of a smaller actuator that uses less energy. The material used for the discs (e.g., the seal plates) can be changed depending on the required valve lifetime and the amount of abrasive media within the coolant streams.

For purposes of operational and packaging efficiency, it may be useful to combine multiple components of a vehicle cooling system into a single, integrated thermal control module. Such a thermal control module may include, for example, the cooling circuit pump, a fluid reservoir, one or more fluid valves, a cooling system controller, sensors, etc., A housing of the thermal control module may include internal passageways that permit fluid communication between the various components of the system managed by the thermal control module. Portions of the module housing may be configured to replace housing elements of certain components. For example, a portion of the module housing may be used to provide a valve body of a fluid valve, whereby the fluid valve is connected to and integrated with the module housing. In some embodiments, the valve body, as integrated into the module housing, defines an interface with a fluid manifold, thus eliminating internal passages within the valve body and/or module housing. As a result, the valve ports defined in the valve body may be configured to reduce pressure drop between the valve and the manifold as compared to some conventional valve bodies.

In some aspects, a valve includes a valve housing and a diverter and seal assembly disposed in the housing. The valve housing includes an inner surface that defines a chamber, chamber walls that segregate the chamber into subchambers that provide a portion of a fluid path through the valve housing, and valve ports, each valve port communicating with the chamber. The diverter is disposed in the chamber. The diverter has a diverter outer diameter and is configured to control fluid flow through the valve housing. The diverter includes a shaft that extends through an opening in the valve housing. The shaft is rotatable about a rotational axis. The seal assembly is disposed in the chamber so as to be aligned along the rotational axis with the diverter. The seal assembly is configured to provide a fluid-tight seal between the diverter and the valve housing. In at least one rotational orientation of the diverter with respect to the valve housing, the diverter is configured to a) divert fluid flow circumferentially along a first circumferential fluid path portion between a first subchamber disposed between the rotational axis and the sidewall and a second subchamber disposed between the rotational axis and the sidewall, and b) divert fluid flow circumferentially along a second circumferential fluid path portion between a third subchamber disposed between the rotational axis and the sidewall and a fourth subchamber disposed between the rotational axis and the sidewall.

In some embodiments, the second circumferential fluid path portion is disposed radially outward with respect to the first circumferential fluid path portion, and the first circumferential fluid path portion and the second circumferential fluid path portion reside within an area circumscribed by the diverter outer diameter.

In some embodiments, the first circumferential fluid path portion and the second circumferential fluid path portion are concentric.

In some embodiments, in the at least one rotational orientation of the diverter with respect to the valve housing, the diverter is configured to divert fluid flow radially along a first radial fluid path portion between a fifth subchamber disposed between the rotational axis and the sidewall and a sixth subchamber disposed between the rotational axis and the sidewall.

In some embodiments, the diverter includes a dome that encloses the first circumferential fluid path portion, and the dome does not enclose the second circumferential fluid path portion.

In some embodiments, the diverter includes a diverter body having a sealing side and an outer side that is opposite the sealing side and a shaft that protrudes from the outer side and extends through an opening in the valve housing. The diverter also includes through openings that extend between the sealing side and the outer side and domes that protrude from the outer side, each dome enclosing a unique one of the through openings.

In some embodiments, the diverter includes a diverter body having a sealing side and an outer side that is opposite the sealing side, a shaft that protrudes from the outer side and extends through an opening in the valve housing and through openings that extend between the sealing side and the outer side. At least one through opening is arc shaped and has a first radius, and at least one through opening is circular sector shaped and has a second radius. The second radius is less than the first radius.

In some embodiments, the seal assembly includes a first seal plate and a second seal plate. The first seal plate includes a first plate sealing surface and the second seal plate includes a second plate sealing surface that abuts and forms a fluid-tight seal with the first plate sealing surface. One of the first plate sealing surface and the second plate sealing surface includes a planar surface, and the other of the first plate sealing surface and the second plate sealing surface includes an annular protrusion. An end face of the annular protrusion cooperates with the planar surface to form the fluid tight seal.

In some embodiments, the first seal plate is a disc-shaped plate that is fixed relative to the diverter, the second seal plate is a disc-shaped plate that is fixed relative to the base, whereby the first seal plate is rotatable relative to the second seal plate.

In some embodiments, the diverter is rotatable relative to the seal assembly, a base-facing surface of the diverter defines a diverter sealing surface and the seal assembly is stacked with respect to the diverter in a direction parallel to the rotational axis with no intervening structures between the seal assembly and diverter sealing surface. In addition, the seal assembly abuts the base and is fixed relative to the base, the seal assembly includes a seal plate that is disposed between the base and the diverter, and an elastic element that is disposed between the base and the seal plate, and a fluid tight seal exists at the interface between the seal plate and the diverter sealing surface.

In some embodiments, the subchambers comprise a first subchamber that resides between the rotational axis and the sidewall, and a second subchamber that resides between the first subchamber and the sidewall.

In some embodiments, each valve port communicates with a unique subchamber.

In some embodiments, the chamber walls include base wall portions that protrude from the base and a first subset of the base wall portions joins the first subchamber to a respective valve port of the first subchamber. In addition, the first subset of the base wall portions defines a linear fluid passageway that is non radial with respect to the rotational axis.

In some embodiments, a second subset of the base wall portions joins the third subchamber to a respective valve port of the third subchamber, and the second subset of the base wall portions defines a linear fluid passageway that is radial with respect to the rotational axis.

In some embodiments, a height of the sidewall is less than a diameter of the sidewall.

In some embodiments, the lid has a central opening through which a shaft of the diverter extends. In addition, the lid includes a shaft seal that prevents fluid leakage between the shaft and the central opening, and the lid includes lid seal that prevents fluid leakage between the lid and the valve body.

In some aspects, a fluid delivery system includes a pump and a rotary disc valve connected to the pump via a fluid line. The rotary disc valve includes a valve housing, a diverter and a seal assembly. The valve housing includes an inner surface that defines a chamber, chamber walls that segregate the chamber into subchambers that provide a portion of a fluid path through the valve housing, and valve ports. Each valve port communicates with the chamber. The diverter is disposed in the chamber. The diverter has a diverter outer diameter and is configured to control fluid flow through the valve housing. The diverter includes a shaft that extends through an opening in the valve housing. The shaft is rotatable about a rotational axis. The seal assembly is disposed in the chamber so as to be aligned along the rotational axis with the diverter. The seal assembly is configured to provide a fluid-tight seal between the diverter and the valve housing. In at least one rotational orientation of the diverter with respect to the valve housing, the diverter is configured to a) divert fluid flow circumferentially along a first circumferential fluid path portion between a first subchamber disposed between the rotational axis and the sidewall and a second subchamber disposed between the rotational axis and the sidewall, and b) divert fluid flow circumferentially along a second circumferential fluid path portion between a third subchamber disposed between the rotational axis and the sidewall and a fourth subchamber disposed between the rotational axis and the sidewall.

In some embodiments, the second circumferential fluid path portion is disposed radially outward with respect to the first circumferential fluid path portion, and the first circumferential fluid path portion and the second circumferential fluid path portion reside within an area circumscribed by the diverter outer diameter.

In some embodiments, the diverter includes a dome that encloses the first circumferential fluid path portion, and the second circumferential fluid path portion is free of enclosure by a dome of the diverter.

In some embodiments, the diverter includes a diverter body having a sealing side and an outer side that is opposite the sealing side and a shaft that protrudes from the outer side and extends through an opening in the valve housing. In addition, the diverter includes through openings that extend between the sealing side and the outer side and domes that protrude from the outer side, each dome enclosing a unique one of the through openings.

In some embodiments, the diverter includes a diverter plate having a sealing side and an outer side that is opposite the sealing side, a shaft that protrudes from the outer side and extends through an opening in the valve housing and through openings that extend between the sealing side and the outer side. At least one through opening is sector-shaped and has a first radius, and at least one through opening is sector shaped and has a second radius. The second radius is less than the first radius.

BRIEF DESCRIPTION OF THE FIGURES

FIG. 7 is a cross-sectional view of the valve body as seen along line 7-7 of FIG. 5.

FIG. 10 is a cross-sectional view of the valve body as seen along line 10-10 of FIG. 6.

FIG. 11 is a cross-sectional view of the valve body as seen along line 11-11 of FIG. 6.

FIG. 15A is a schematic illustration of the connection between ports for a diverter rotational orientation corresponding to a first operating mode.

FIG. 15B is a top plan view of the rotary disc valve with the lid omitted illustrating the rotational orientation of the diverter relative to the valve body when the rotary disc valve is in a first operating mode.

FIG. 16A is a schematic illustration of the connection between ports for a diverter rotational orientation corresponding to a second operating mode.

FIG. 16B is a top plan view of the rotary disc valve with the lid omitted illustrating the rotational orientation of the diverter relative to the valve body when the rotary disc valve is in a second operating mode.

FIG. 17A is a schematic illustration of the connection between ports for a diverter rotational orientation corresponding to a third operating mode.

FIG. 17B is a top plan view of the rotary disc valve with the lid omitted illustrating the rotational orientation of the diverter relative to the valve body when the rotary disc valve is in a third operating mode.

FIG. 18A is a schematic illustration of the connection between ports for a diverter rotational orientation corresponding to a fourth operating mode.

FIG. 18B is a top plan view of the rotary disc valve with the lid omitted illustrating the rotational orientation of the diverter relative to the valve body when the rotary disc valve is in a fourth operating mode.

DETAILED DESCRIPTION

Figure 1:
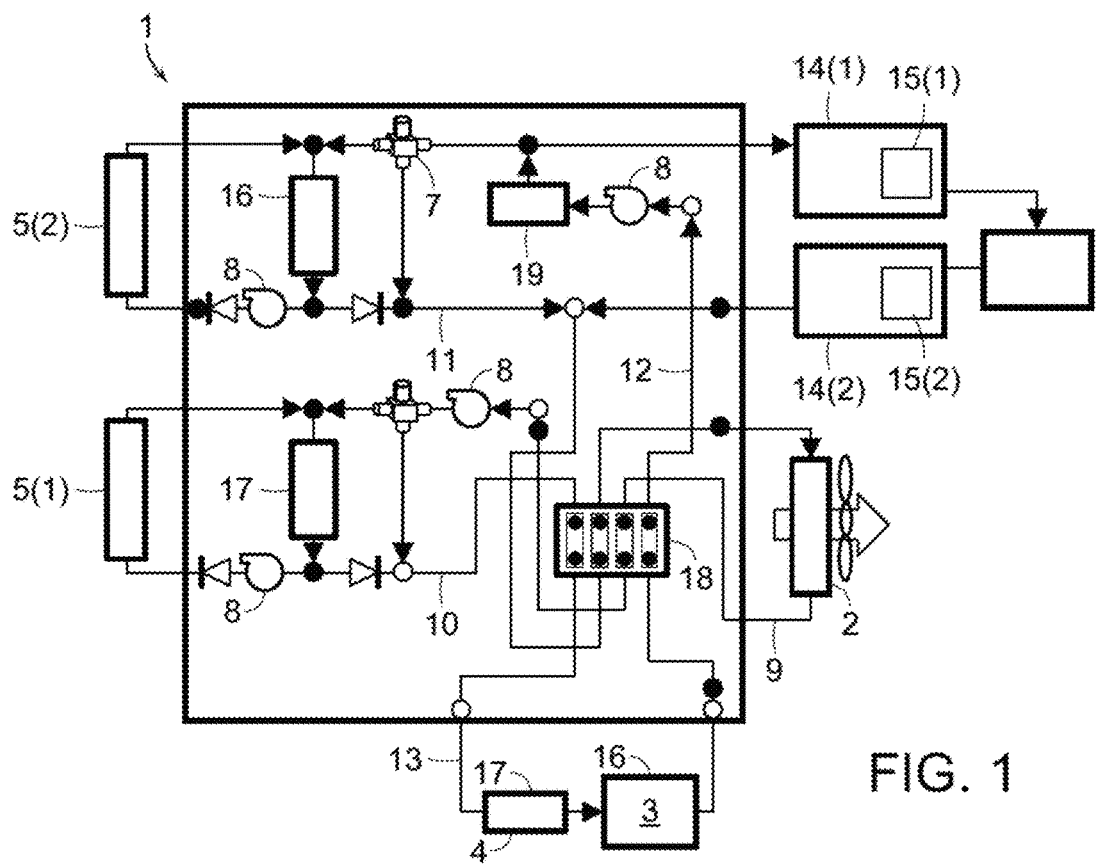
FIG. 1 is a schematic of a vehicle cooling system including a multi-port rotary disc valve.

Referring to FIG. 1, a fluid delivery system 1 includes a multi-port rotary disc valve 18 that controls fluid flow driven by pumps 8 between several fluid lines 9, 10, 11, 12, 13, within the system 1. The rotary disc valve 18 may be used on its own or along with other fluid control valves 7 to control the distribution and flow of coolant in a thermal management system 1 of an electric vehicle. In this example, the rotary disc valve 18 may control flow of coolant fluid between the rotary disc valve 18 and a vehicle radiator 2 via a first fluid line 9. The rotary disc valve 18 may control flow of coolant fluid between the rotary disc valve 18 and heat exchangers 5(1), 5(2) of a vehicle passenger cabin heating and cooling system via a second and third fluid lines 10, 11. The rotary disc valve 18 may control flow of coolant fluid between the rotary disc valve 18 and front and rear electric drive motors 14(1), 14(2), their respective inverters 15(1), 15(2) and a vehicle controller via a fourth fluid line 12. In addition, the rotary disc valve 18 may control flow of coolant between the rotary disc valve and a battery 3 and battery management device 4 via a fifth fluid line 13. The fluid delivery system 1 may include other ancillary devices and structures which are known in the art and facilitate thermal management, including a condenser 16, an evaporator 17, temperature sensors, pressure sensors, check valves, degassing devices 19, etcetera.

Figure 2:
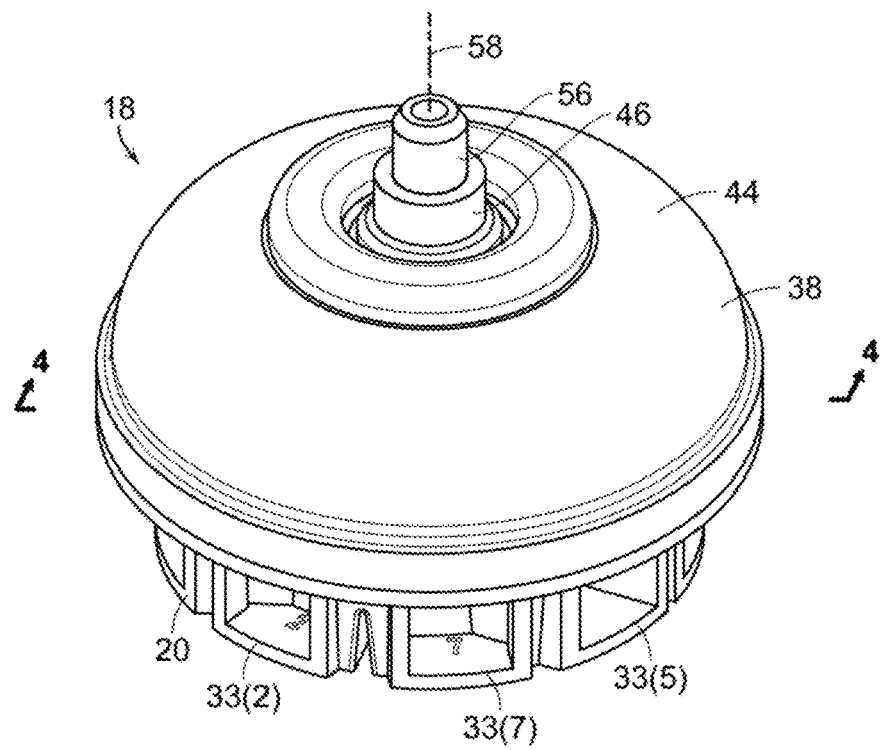
FIG. 2 is a perspective view of the rotary disc valve.
Figure 3:
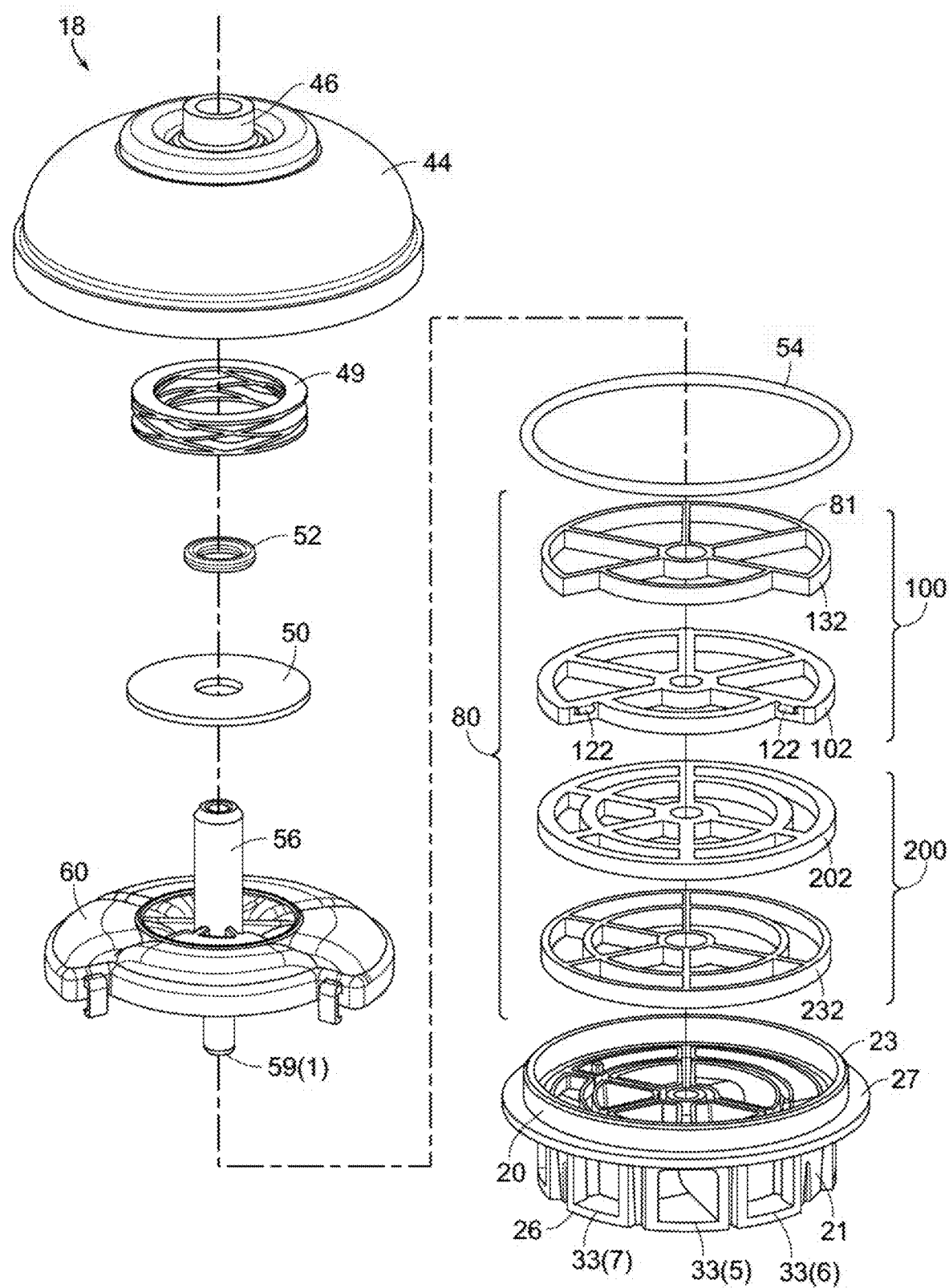
FIG. 3 is an exploded perspective view of the rotary disc valve.
Figure 4:
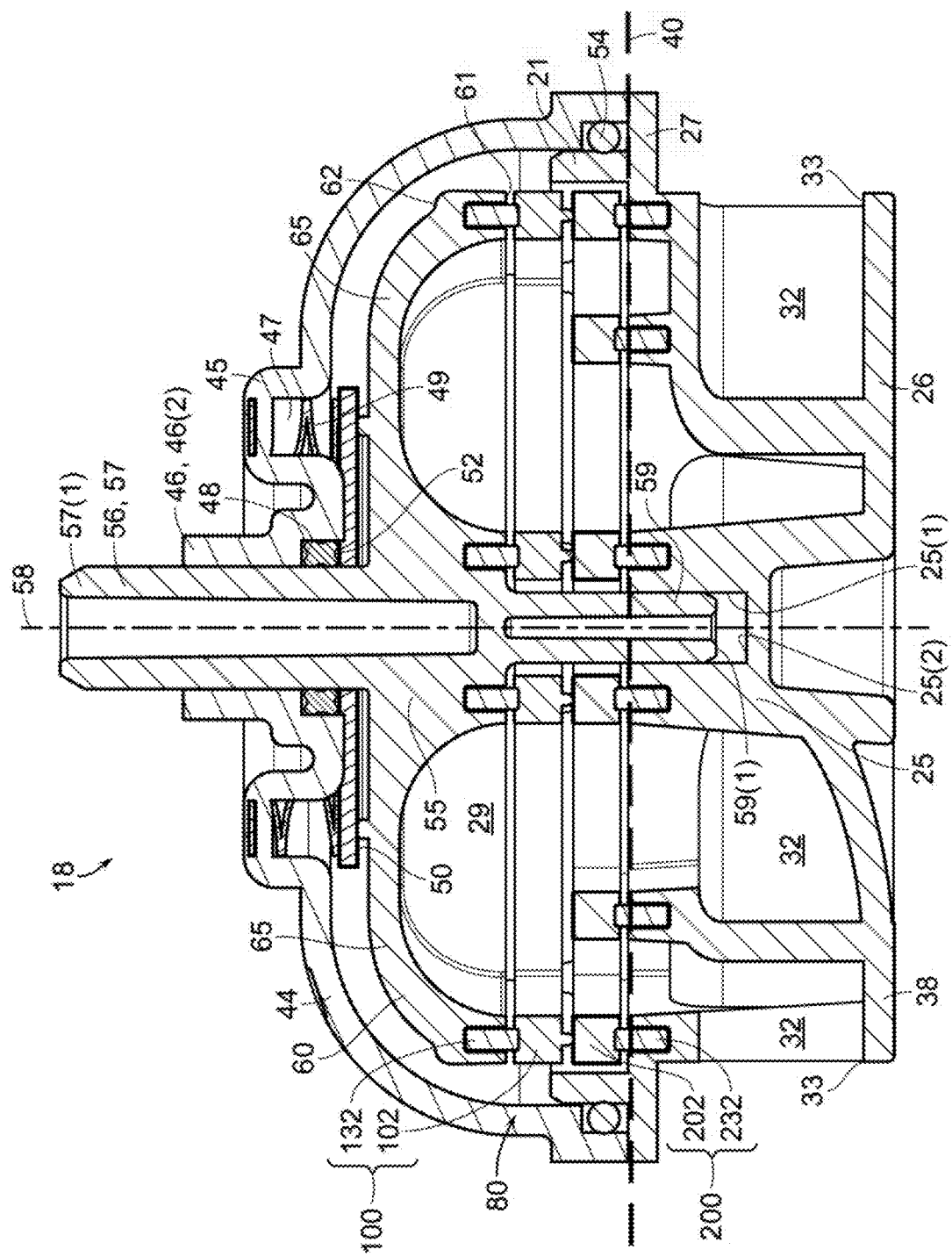
FIG. 4 is a cross-sectional view of the rotary disc valve as seen along line 4-4 of FIG. 2.

Referring to FIGS. 2-4, the rotary disc valve 18 includes a valve housing 38. The valve housing 38 is formed of a valve body 20 and a lid 44. A valve chamber 29 is defined between the valve body 20 and the lid 44. The rotary disc valve 18 includes a diverter 60 that is disposed in the valve chamber 29. The diverter 60 includes a valve shaft 56 that protrudes through a lid 44 that closes an open end of the valve body 20. The valve shaft 56 is configured to be connected to a valve actuator (not shown). Upon actuation, the valve shaft 56 and the diverter 60 rotate in concert relative to the valve body 20 about a rotational axis 58, and the rotational orientation of the diverter 60 relative to the valve body 20 is set via the valve actuator. In addition, the rotary disc valve 18 has a seal assembly 80 that provides a fluid-tight seal between the valve body 20 and the diverter 60. The valve body 20 includes multiple valve ports 33, the number of valve ports 33 being determined by the specific application. In the illustrated embodiment, the rotary disc valve includes eight ports 33(1), 33(2), 33(3), 33(4), 33(5), 33(6), 33(7), 33(8). The rotational orientation of the diverter 60 relative to the valve body 20 determines one or more fluid flow paths through corresponding ones of the valve ports 33, whereby the distribution of coolant fluid in the coolant system 1 is controlled. Details of the rotary disc valve 18, including the valve body 20, the lid 44, the diverter 60 and the seal assembly 80, will now be described.

Valve Body

Referring to FIGS. 5-11, the valve body 20 includes a sidewall 21, and a base 26 that closes one end (referred to here as the "base end") 22 of the sidewall 21. The sidewall 21 has an open end 23 that is opposite the base end 22. The sidewall 21 is a revolved section and has a circular profile when viewed in a direction parallel to the rotational axis 58 (FIG. 10). Although the sidewall 21 as illustrated in cylindrical, it could alternatively be, for example, conical or ellipsoidal. The sidewall 21 is joined at the base end 22 to a peripheral edge of the base 26, and the sidewall 21 surrounds the base 26. The sidewall 21 and the base 26 together form a generally cup-shaped structure. The lid 44 detachably connects to and closes the open end 23 of the sidewall 21. Together, the inner surfaces of the valve body 20 and the lid 44 define a valve chamber 29 therebetween.

The valve body 20 includes a central plain bearing 25 that protrudes from the base 26 toward the sidewall open end 23.

The bearing 25 is coaxial with the rotational axis 58 and opens at a first plane 40 which is described below. An inner surface of the bearing 25 defines a cylindrical bearing surface 25(1) and terminates in a blind end 25(2) (FIG. 7). The bearing 25 supports an end 59(1) of the valve shaft 56 for rotation about the rotational axis 58, as discussed below.

Figure 8:
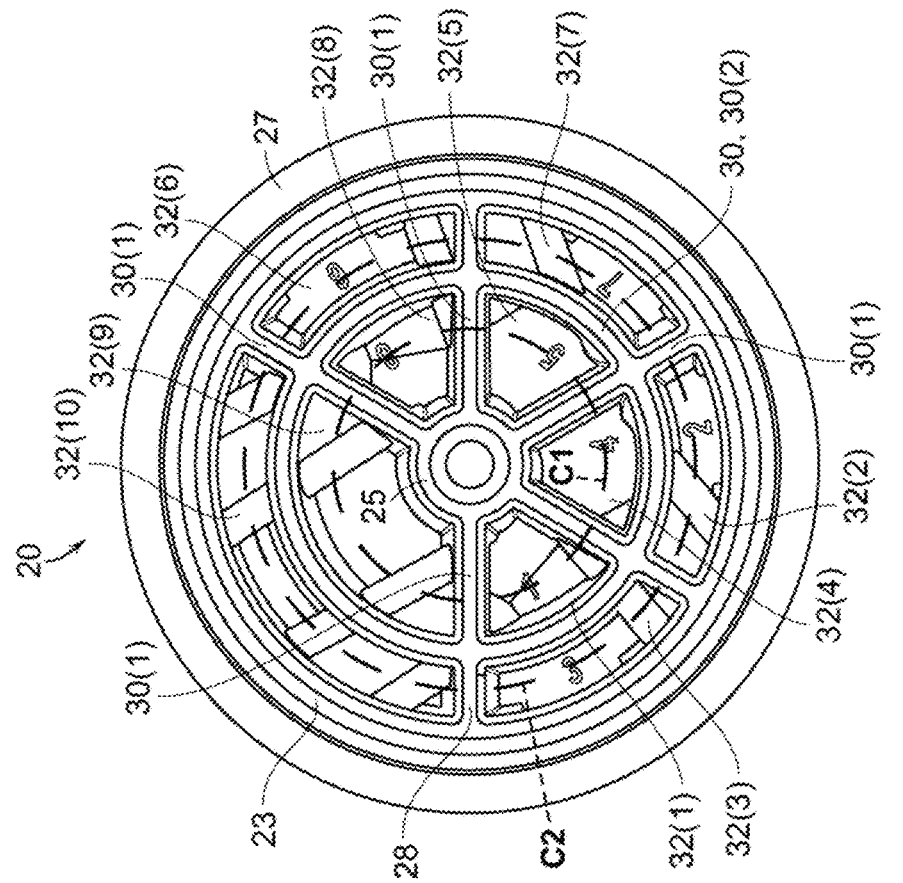
FIG. 8 is a top plan view of the valve body.
Figure 12:
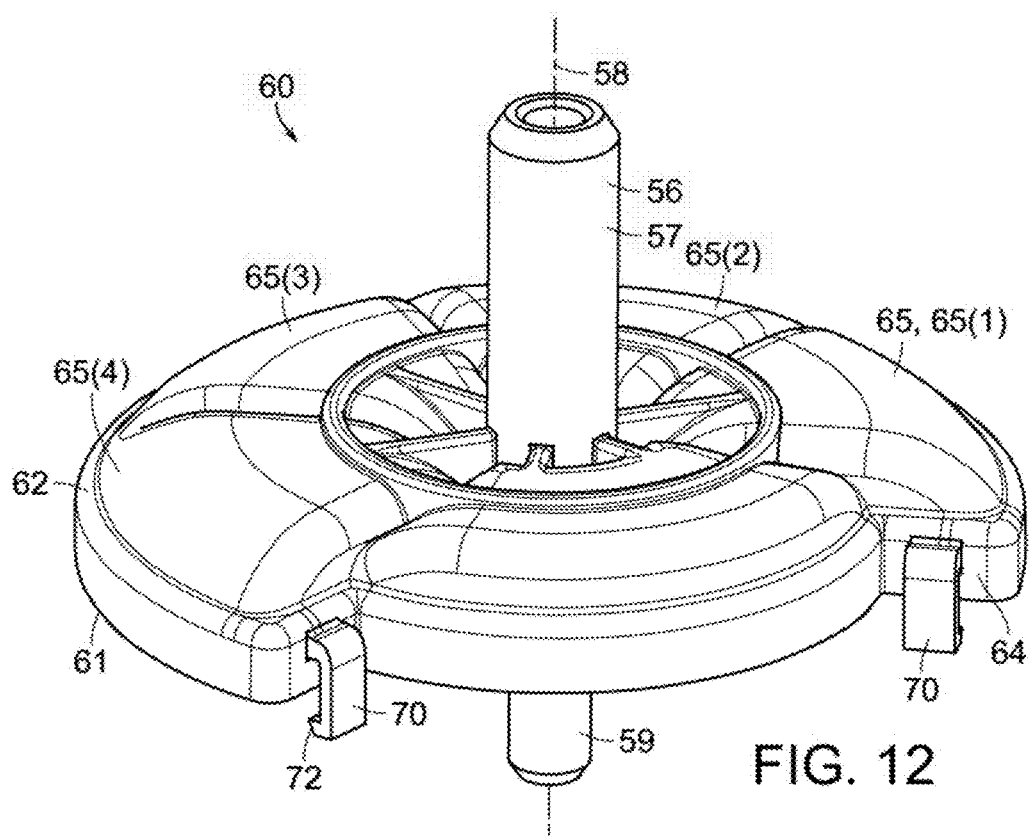
FIG. 12 is a top perspective view of the diverter.

The valve body 20 includes chamber walls 30 that segregate the valve chamber 29 into subchambers 32. The chamber walls 30 include radial wall portions 30(1) and a circumferential wall portion 30(2) (FIGS. 8 and 10). The radial wall portions 30(1) extend radially with respect to the rotational axis 58 between the bearing 25 and the sidewall 21. The circumferential wall portion 30(2) extends circumferentially and is disposed between the bearing 25 and the sidewall 21. In the illustrated embodiment, there are five radial wall portions 30(1). As a result, the valve body 20 includes ten subchambers 32(1), 32(2), 32(3), 32(4), 32(5), 32(6), 32(7), 32(8), 32(9), 32(10). Five of the ten subchambers, referred to as the "radially innermost subchambers" (e.g., subchambers 32(1), 32(4), 32(5), 32(8), 32(9)) are sector shaped and disposed between the bearing 25 and the circumferential wall portion 30(2). The radially innermost subchambers 32(1), 32(4), 32(5), 32(8), 32(9) are disposed along a first circle C1 (shown in broken lines in FIG. 8) that is centered on the rotational axis 58. The remaining subchambers, referred to as the "radially outermost subchambers" (e.g., subchambers 32(2), 32(3), 32(6), 32(7), 32(10)) are disposed between the circumferential wall portion 30(2) and the sidewall 21. The radially outermost subchambers 32(2), 32(3), 32(6), 32(7), 32(10) are each radially aligned with one of the radially innermost subchambers 32(1), 32(4), 32(5), 32(8), 32(9), and have a truncated sector (e.g., arc) shape. The radially outermost subchambers 32(2), 32(3), 32(6), 32(7), 32(10) are disposed along a second circle C2 (shown in broken lines in FIG. 8) that is centered on the rotational axis 58 and has a greater diameter than the first circle.

Eight subchambers (e.g., subchambers 32(1), 32(2), 32(3), 32(4), 32(5), 32(6), 32(7), 32(8)) are "working subchambers." The working subchambers 32(1), 32(2), 32(3), 32(4), 32(5), 32(6), 32(7), 32(8) are in fluid communication with a corresponding one of the valve ports 33(1), 33(2), 33(3), 33(4), 33(5), 33(6), 33(7), 33(8) and one valve port 33 communicates with each working subchamber 32. The remaining subchambers 32(9), 32(10), which are radially aligned, are not working subchambers, e.g., they are "non-working subchambers" since they are not associated with a valve port 33 and perform no fluid routing function in the rotary disc valve 18.

Figure 5:
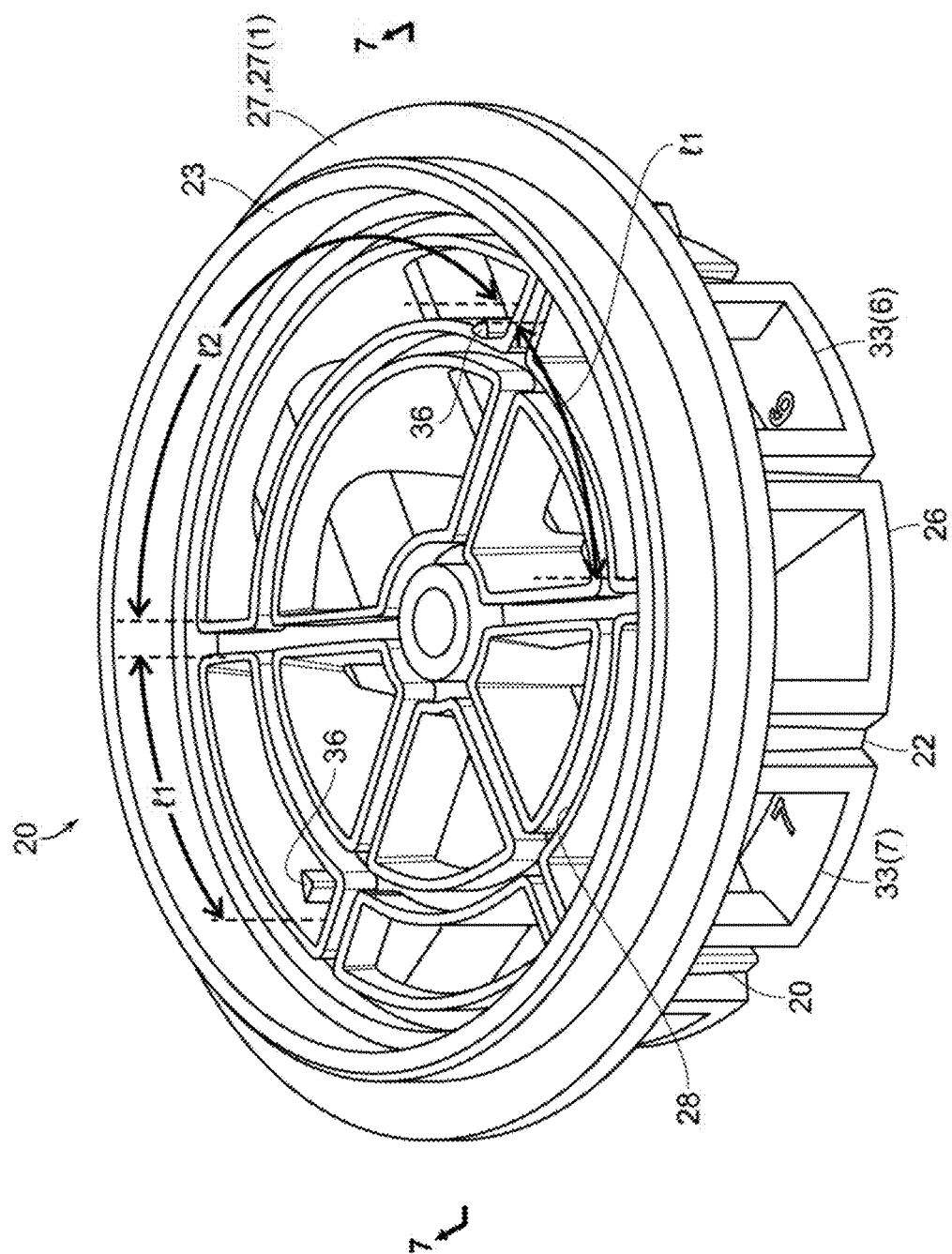
FIG. 5 is a top perspective view of the valve body.
Figure 6:
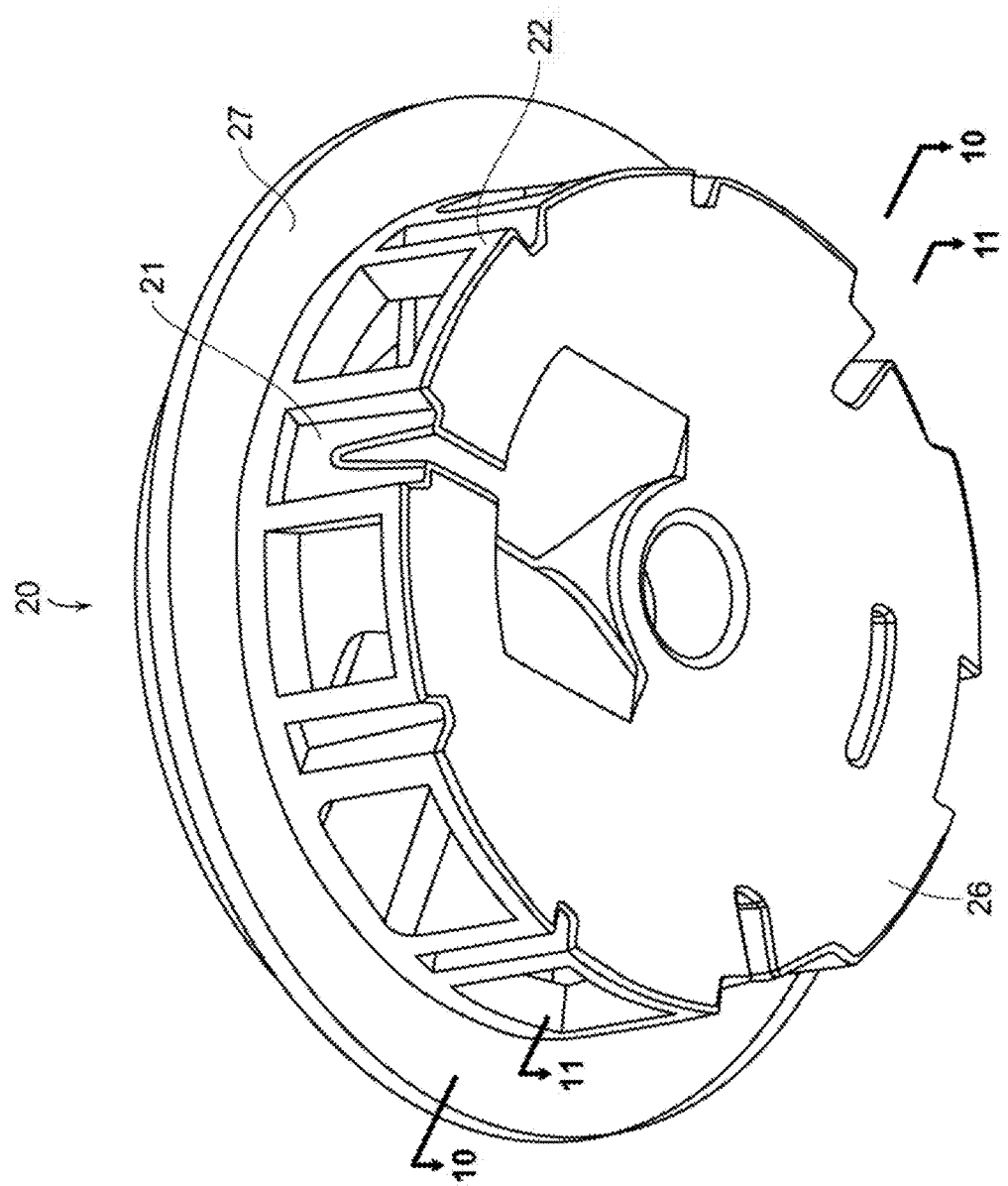
FIG. 6 is a bottom perspective view of the valve body.
Figure 9:
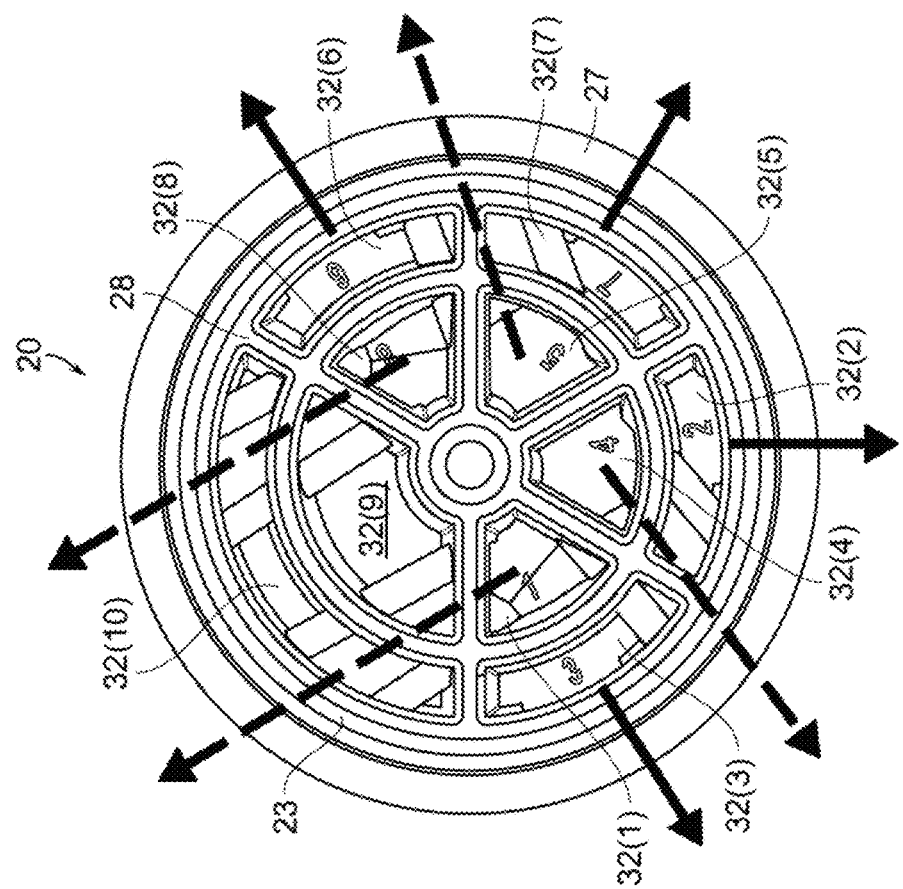
FIG. 9 is a top plan view of the valve body including solid arrows that represent the flow path of fluid exiting the ports associated with the radially outermost subchambers and broken arrows that represent the flow path of fluid exiting the ports associated with the radially innermost subchambers.

The working subchambers 32(1), 32(2), 32(3), 32(4), 32(5), 32(6), 32(7), 32(8) each have a shorter arc length as compared to that of the remaining subchambers 32(9), 32(10). In the illustrated embodiment, the working subchambers 32 have the same arc length, but are not limited to this configuration. For example, in the illustrated embodiment, the working subchambers 32(1), 32(2), 32(3), 32(4), 32(5), 32(6), 32(7), 32(8) have an arc length l1 in a range of 30 degrees to 60 degrees and the remaining subchambers 32(9), 32(10) have an arc length l2 in a range of 120 degrees to 240 degrees (FIG. 5).

In the illustrated embodiment, the working subchambers 32(1), 32(2), 32(3), 32(4), 32(5), 32(6), 32(7), 32(8) are in fluid communication with a corresponding one of the valve ports 33(1), 33(2), 33(3), 33(4), 33(5), 33(6), 33(7), 33(8) and one valve port 33 communicates with each working subchamber 32.

Each subchamber 32 is segregated from the other subchambers 32 by the chamber walls 30. The chamber walls 30 have exposed ends 31 that are spaced apart from the base 26 and intersect the sidewall 21. The exposed ends 31 of the chamber walls 30 are aligned with the first plane 40. The first plane 40 is substantially perpendicular to the rotational axis 58 and intersects the sidewall 21 at an axial location between the sidewall open end 23 and the valve ports 33. A shallow channel 28 (FIG. 7) is formed in the exposed ends 31. The channel 28 has a profile that corresponds to the shape of the facing element (e.g., the second elastic element 232) of the seal assembly 80. The channel 28 receives and supports this portion of the seal assembly 80, as discussed further below.

In the illustrated embodiment, the valve body 20 includes eight valve ports 33 but is not limited to this number of valve ports 33. In particular, the valve body 20 includes a first valve port 33(1), a second valve port 33(2), a third valve port 33(3), a fourth valve port 33(4), a fifth valve port 33(5), a sixth valve port 33(6), a seventh valve port 33(7) and an eighth valve port 33(8). Each of the valve ports 33 corresponds to an opening the sidewall 21 and communicates with a corresponding one of the subchambers 32. The valve ports 33 extend within a common second plane 42 that is substantially perpendicular to the rotational axis 58 and intersects the sidewall 21 at an axial location between the first plane 40 and the base 26 of the body 20.

In many applications, the configuration of the valve ports 33 is determined by packaging requirements. In the illustrated embodiment, the valve ports 33 define generally rectangular openings in the valve body sidewall 21 but are not limited to this shape. The valve ports 33 are provided at spaced-apart locations about a common circumference of the sidewall 21. In the illustrated embodiment, the ports 33 are irregularly spaced apart along the circumference of the valve body 20. However, the valve ports 33 are not limited to the illustrated spacing and/or co-planar configuration.

In the illustrated embodiment, the valve ports 33 are not equidistantly spaced apart from each other. For example, the first and eighth valve ports 33(1), 33(8) are positioned on one lateral side of the valve body 20, whereas the remaining valve ports 33(2), 33(3), 33(4), 33(5), 33(6), 33(7) are disposed on the opposed lateral side of the valve body 20. This arrangement is at least in part a result of the configuration of internal fluid passageways that provide fluid communication between the valve ports 33 and the corresponding valve subchambers 32. For example, the radially outermost working subchambers 32(2), 32(3), 32(6), 32(7) adjoin the sidewall 21, and the corresponding valve ports 33(2), 33(3), 33(6), 33(7) are openings in the sidewall 21 that directly communicate with these subchambers 32. Fluid exiting these valve ports 33(2), 33(3), 33(6) 33(7) exits the valve body 20 along a linear path that is radial with respect to the valve rotational axis 58.

The radially innermost working subchambers 32(1), 32(4), 32(5), 32(8) are fluidly connected to the corresponding valve ports 33(1), 33(4), 33(5), 33(8) via base fluid passageways 35 (FIG. 11). For example, the first subchamber 32(1) communicates with the first port 33(1) via a first base fluid passageway 35(1). The fourth subchamber 32(4) communicates with the fourth port 33(4) via a second base fluid passageway 35(2). The fifth subchamber 32(5) communicates with the fifth port 33(5) via a third base fluid passageway 35(3). In addition, the eighth subchamber 32(8) communicates with the eighth port 33(8) via a fourth base fluid passageway 35(4). Each of the base fluid passageways 35(1), 35(2), 35(3) 35(4) extends along a linear path that is non-radial with respect to the valve rotational axis 58.

The valve body 20 includes at least one valve body stay 36 that protrudes axially toward the seal assembly 80 from the exposed end 31 of one of the chamber walls 30. In the illustrated embodiment, the valve body 20 includes two valve body stays 36, the valve body stays 36 being disposed on opposed sides of the bearing 25. Each valve body stay 36 is a rigid rod that extends, beginning at plane 40, and terminating at a location that is spaced apart from the sidewall open end 23. The valve body stays 36 are configured to engage with a portion of the seal assembly 80, as discussed further below.

The valve body 20 includes a sidewall flange 27 that protrudes from an outer surface of the sidewall 21. The sidewall flange 27 is disposed adjacent to the sidewall open end 23 and extends about the circumference of the sidewall 21. A lid-facing surface 27(1) of the sidewall flange 27 resides in the plane 40 and supports the lid 44 when the lid 44 is assembled with the valve body 20.

LID

Referring to FIGS. 2, 3 and 4, the rotary disc valve 18 includes the lid 44 that closes the open end of the valve body 20. The lid 44 has a curved dome shape and includes an integral cylindrical sleeve 46 that is coaxial with the rotational axis 58. The sleeve 46 extends outward from an outer surface of the lid 44. The sleeve 46 has a non-uniform inner diameter, and a shoulder 48 is disposed at the transition between a large diameter portion 46(1) and a small diameter portion 46(2). The small diameter portion 46(2) resides outside the lid 44, whereas the large diameter portion 46(1) is generally co-extensive with a central portion of the lid 44. The small diameter portion 46(2) has an inner diameter that is dimensioned to receive the valve shaft 56 in a clearance fit, for example a running fit, whereby the small diameter portion 46(2) serves as a bushing of the valve shaft 56. The large diameter portion 46(1) defines a recess that receives a shaft seal 52 therein.

The lid 44 includes an annular protrusion 45 that surrounds the sleeve 46. The annular protrusion 45 is hollow and opens at the lid inner surface forming an annular groove 47. The annular groove receives one end of an elastic element such as coil spring (not shown) or stacked wave disc spring 49 (shown). The opposed end of the spring 49 abuts a flat washer 50 that resides between the lid and the diverter 60. An inner diameter of the washer 50 encircles the valve shaft 56 and an outer diameter of the washer 50 is greater than an outer diameter of the groove 47. In this assembly, the spring 49 is under compression and thus applies an axial force to the diverter 60 and the seal assembly 80, which reside between the washer 50 and the base 26 of the valve body 20. By this configuration, the axial force ensures that a fluid tight seal exists between the diverter 60 and the valve body 20.

Shaft Seal

The shaft seal 52 is disposed between the valve shaft 56 and the sleeve large diameter portion 46(1). The shaft seal 52 provides a fluid seal between the valve shaft 56 and the sleeve 46. The shaft seal 52 is annular and may be formed of an elastomer that is compatible with automotive coolant, such as ethylene propylene diene monomer (EPDM). In the illustrated embodiment, the shaft seal 52 is an O-ring having an "X" cross-sectional shape. In other embodiments, the shaft seal 52 may have other cross-sectional shapes, such as, but not limited to, rectangular, oval or "I" shapes. The shaft seal 52 is retained on the valve shaft 56 at an axial location corresponding to the sleeve large diameter portion 46(1) via the washer 50 and the shoulder 48.

Lid Seal

The rotary disc valve includes a lid seal 54 that is disposed between an inner surface of the lid 44, an outer surface of the sidewall 21 and the sidewall flange 27. The lid seal 54 provides a fluid seal between the lid 44 and the valve body 20. The lid seal 54 is annular and may be formed of an elastomer that is compatible with automotive coolant, such as ethylene propylene diene monomer (EPDM). In the illustrated embodiment, the lid seal 54 is an O-ring having an "O" cross-sectional shape. In other embodiments, the lid seal 54 may have other cross-sectional shapes, such as, but not limited to, rectangular, oval, "X", or "I" shapes.

Diverter

Referring to FIGS. 3-4 and 12-13, the diverter 60 is disposed in the valve chamber 29 and is rotatable relative to the valve body 20 about the rotational axis 58. The diverter 60 is a flat plate having an irregular peripheral shape and includes a base-facing surface 61 (e.g., a sealing side) that faces toward the valve body base 26, and a lid-facing surface 62 (e.g., an outer side) that is opposed to the diverter base-facing surface 61. Although generally circular, the diverter 60 has an arc-shaped cut out 64 along a periphery of a sector of the diverter 60, as discussed below.

The diverter 60 includes a valve shaft 56 that protrudes from the center of the diverter outer surface 62 in a direction that is substantially perpendicular to the diverter base-facing surface 61. The valve shaft includes a first portion 57 that is disposed on the lid-facing side of the diverter 60 and a second portion 59 that is disposed on the base-facing side of the diverter 60.

The valve shaft first portion 57 extends through, and is rotatably supported by, the lid sleeve 46 in such a way that an end 57(1) of the first portion 57 is disposed outside the rotary disc valve 18. The end 57(1) of the valve shaft first portion 57 is configured to be connected to the valve actuator, which drives the valve shaft 56 to rotate about the rotational axis 58. For example, in the illustrated embodiment, the outer surface of the end 57(1) may include flats, splines or other features (not shown) that permit mechanical engagement with an output structure of the valve actuator.

The valve shaft second portion 59 is opposite the first portion 57 and is surrounded by a boss 55. An end 59(1) of the valve shaft second portion 59 protrudes from the boss 55 and is shaped and dimensioned to be received and rotatably supported by the plain bearing 25 that is provided in the valve body base 26.

Figure 13:
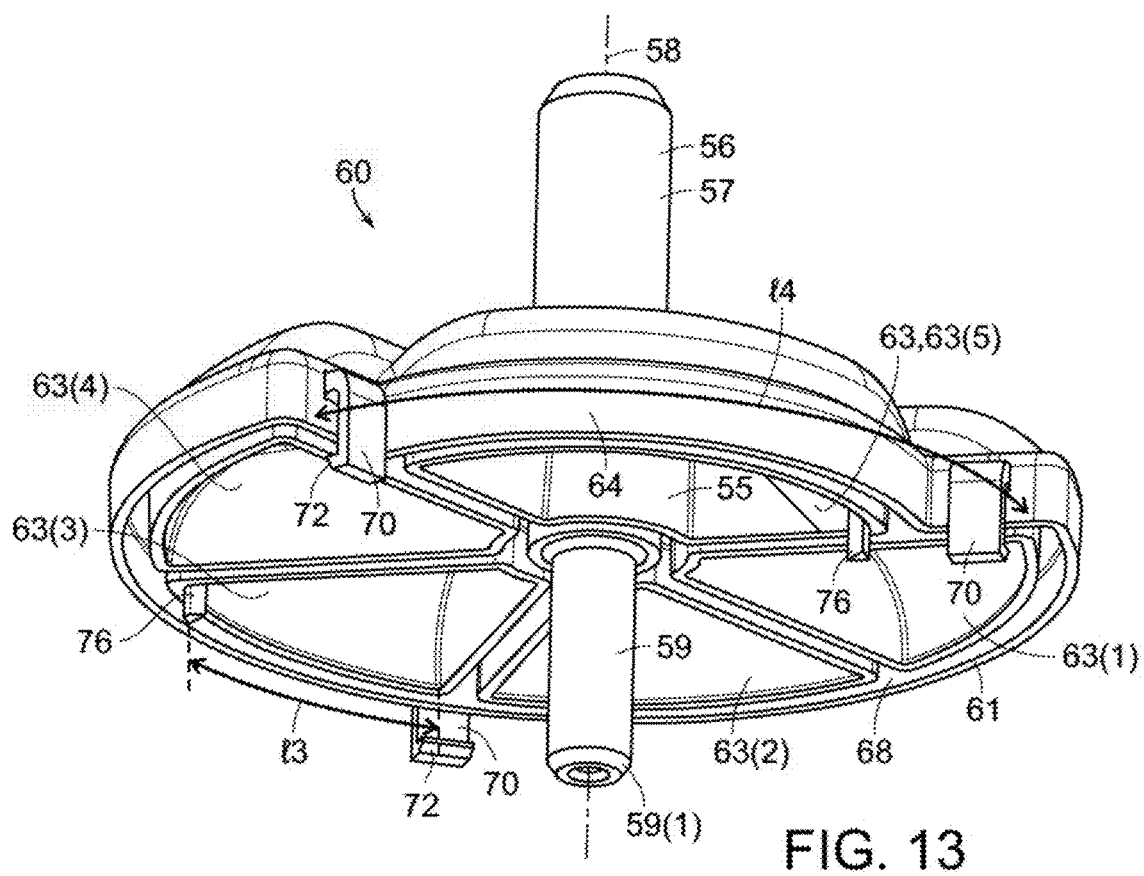
FIG. 13 is a bottom perspective view of the diverter.

The diverter 60 includes diverter through openings 63 having a circular sector-shaped profile when the diverter 60 is viewed in a direction parallel to the rotational axis 58. The diverter through openings 63 extend between the diverter base-facing surface 61 and the diverter outer surface 62, whereby fluid enters and exits the diverter 60 in a direction that is parallel to the rotational axis 58. In the illustrated embodiment, the diverter 60 includes five diverter through openings 63(1), 63(2), 63(3), 63(4), 63(5) that are arranged side-by-side and encircle the rotational axis 58. The first, second, third and fourth diverter through openings 63(1), 63(2), 63(3), 63(4) have a shorter arc length as compared to that of the fifth diverter through opening 63(5), and have a longer radial dimension as compared to that of the fifth diverter through opening 63(5). For example, in the illustrated embodiment, the first, second, third and fourth diverter through openings 63(1), 63(2), 63(3), 63(4) have an arc length l3 in a range of 30 degrees to 60 degrees and the fifth diverter through opening 63(5) has an arc length (4 in a range of 120 degrees to 240 degrees (FIG. 13). In addition, the fifth diverter through opening 63(5) has a radial dimension in a range of 40 percent to 70 percent of the radial dimension of the first, second, third and fourth diverter through openings 63(1), 63(2), 63(3), 63(4). The fifth diverter through opening 63(5) is disposed adjacent to the valve shaft 56, whereby the cut-out 64 is formed along the periphery of the diverter 60.

The diverter 60 includes domes 65 that protrude from the diverter outer surface 62 and overlie each of the diverter through openings 63(1), 63(2), 63(3), 63(4), 63(5). In particular, each dome 65 is a concave structure that opens facing the base 26. Each dome 65 encloses a corresponding one of the diverter through openings 63. As a result, fluid entering one of the diverter through openings 63 from one valve body subchamber 32 may be redirected to an adjacent valve body subchamber 32, as discussed in detail below. Thus, each dome 65 provides a portion of an "enclosed" fluid passageway within the rotary disc valve 18.

The diverter cut out 64 is not enclosed by a dome, and fluid entering the cut out 64 of the diverter 60 from a respective subchamber 32 is constrained by the valve body 20 and lid 44 and redirected toward an adjacent subchamber 32, as discussed in detail below. In other words, for certain rotational positions of the diverter 60 relative to the valve body 20, fluid entering the diverter cut out 64 from a corresponding radially-outermost subchamber 32 may be redirected in a circumferential direction to an adjacent radially-outermost subchamber 32 via this "open" portion of a fluid passageway within the rotary disc valve 18.

It is understood that the number, shape, size and spacing of the diverter through 63, as well as the number, shape and size and spacing of the domes 65, are exemplary and in practice will depend on the specific application.

The diverter base-facing surface 61, which includes an end face of the boss 55, faces a corresponding diverter-facing surface 135 of the seal assembly 80. The diverter base-facing surface 61 is generally planar. Due to the size and shape of the diverter through openings 63, the diverter base-facing surface 61 has the appearance of a wagon wheel including spokes and a hub when viewed in bottom plan view. The diverter base-facing surface 61 includes a channel 68 that surrounds the diverter through openings 63 and the shaft 56. The channel 68 provides a recessed pattern that matches the profile of the facing element (e.g., the first elastic element 132) of the seal assembly 80. In addition, the channel 68 receives and supports a portion of the first elastic element 132 of the seal assembly 80, as discussed further below. By this configuration, the first elastic element 132 is rotationally located with respect to, and prevented from relative rotation with respect to, the diverter 60.

The diverter 60 includes at least one diverter stay 76 that protrudes axially toward the seal assembly 80 from the base-facing surface 61 of the diverter 60. In the illustrated embodiment, the diverter 60 includes two diverter stays 76, the diverter stays 76 being disposed on opposed sides of the shaft 56. Each diverter stay 76 is a rigid rod that extends axially and terminates at a location that is spaced apart from the base-facing surface 61. The diverter stays 76 are configured to engage with a portion of the seal assembly 80, as discussed further below.

In addition to the diverter stays 76, the diverter 60 also includes diverter latches 70 along the peripheral outer surface 69 of the diverter 60. Each diverter latch 60 protrudes from the peripheral outer surface 69 at a location adjacent to the diverter lid-facing surface 62 and extends toward the seal assembly 80. Each latch 60 terminates in a hook shaped element 72 that is disposed at a location that is axially spaced relative to the base-facing surface 61. Each hook shaped element 72 is configured to engage with corresponding rib that protrudes from an outer periphery of the first seal plate 102, as discussed further below. In the illustrated embodiment, the diverter 60 includes three diverter latches 70 distributed in a spaced-apart manner about a circumference of the diverter 60.

In the illustrated embodiment, the diverter 60 is formed of a plastic such as Polyoxymethylene (POM) or Polyphenylene Sulfide (PPS).

Seal Assembly

Figure 14:
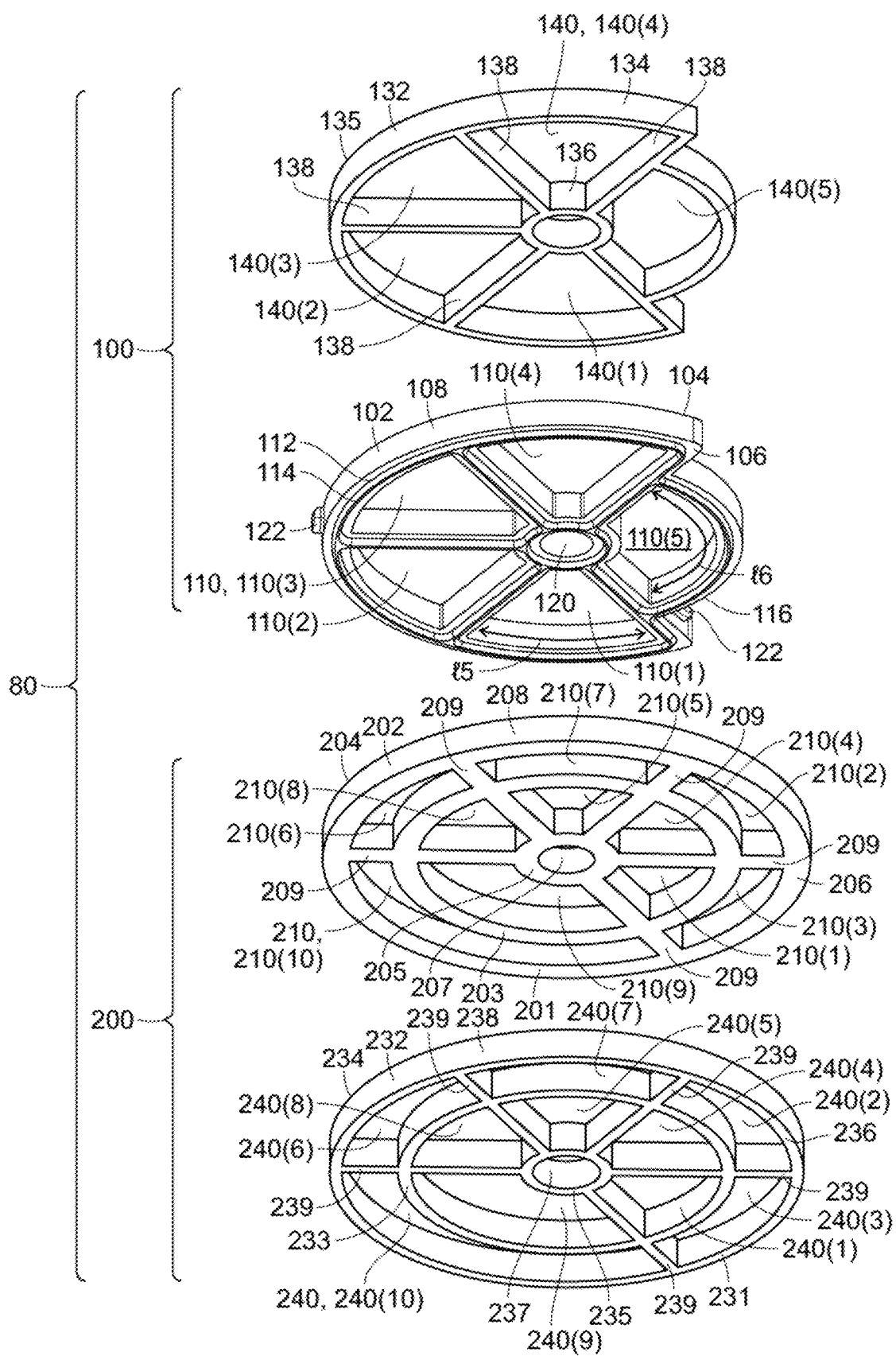
FIG. 14 is an exploded view of the seal assembly.

Referring to FIGS. 3-4 and 14, the seal assembly 80 is disposed in the valve chamber 29 between the diverter base-facing surface 61 and the base 26 of the valve body 20, more particularly between the diverter base-facing surface 61 and channel 28 of the valve body 20. The seal assembly 80 includes a first seal subassembly 100 and a second seal subassembly 200. The first seal subassembly 100 is disposed within the chamber 29 so as to be partially surrounded by the diverter 60 and is fixed relative to the diverter 60. The second seal subassembly 200 is disposed within the valve chamber 29 so as to partially surrounded by the valve body 20 and is fixed relative to the valve body 20. The first and second seal subassemblies 100, 200 are rotatable relative to each other, and will now be described in detail.

The first seal subassembly 100 is an assembly of two sealing elements. In particular, the first seal subassembly 100 includes a first seal plate 102 that is disposed between the diverter base-facing surface 61 and the second seal subassembly 200, and a first elastic element 132 that is disposed between the diverter base-facing surface 61 and the first seal plate 102. The first elastic element 132 is stacked with the first seal plate 102 in a direction parallel to the rotational axis 58. When viewed in a direction parallel to the rotational axis 58, each of the first elastic element 132 and the first seal plate 102 have shape that is similar to that of the diverter base-facing surface 61. The first elastic element 132 and the first seal plate 102 will now be described in detail.

The first seal plate 102 is a rigid, generally cylindrical plate and includes a first plate diverter-facing surface 104 that faces toward the diverter base-facing surface 61, and a first plate base-facing surface 106 that faces toward the base 26. The first seal plate 102 includes a first plate peripheral surface 108 that extends between the first plate diverter-facing and base-facing surfaces 104, 106. The first plate diverter-facing and base-facing surfaces 104, 106 are generally planar (e.g., flat or level and smooth, without surface roughness or irregularities). The first seal plate 102 includes a central opening 120 that is shaped and dimensioned to receive the valve shaft second portion 59 therethrough in a clearance fit.

The first seal plate 102 includes first plate through openings 110. The first plate through openings 110 have a circular sector-shaped profile when the first seal plate 102 is viewed in a direction parallel to the rotational axis 58. The first plate through openings 110 extend between the first plate diverter-facing and base-facing surfaces 104, 106, whereby fluid passes through the first seal plate 102 in a direction that is parallel to the rotational axis 58. In the illustrated embodiment, the first seal plate 102 includes five seal plate through openings 110(1), 110(2), 110(3), 110(4), 110(5) that are arranged side-by-side. The first, second, third and fourth through openings 110(1), 110(2), 110(3), 110(4) of the first seal plate 102 have a shorter arc length as compared to that of the fifth through opening 110(5) of the first seal plate 102 and have a longer radial dimension as compared to that of the fifth through opening 110(5). For example, in the illustrated embodiment, the first, second, third and fourth through openings 110(1), 110(2), 110(3), 110(4) of the first seal plate 102 have an arc length l5 in a range of 30 degrees to 60 degrees and the fifth through opening 110(5) has an arc length l6 in a range of 120 degrees to 240 degrees. In addition of the fifth through opening 110(5) of the first seal plate 102 has a radial dimension in a range of 40 percent to 70 percent of the radial dimension of first, second, third and fourth through openings 110(1), 110(2), 110(3), 110(4) of the first seal plate 102. The fifth through opening 110(5) of the first seal plate 102 is disposed adjacent to the valve shaft 56, whereby a cut-out 116 is formed along the periphery of the first seal plate 102.

In addition, the first plate base-facing surface 106 includes a narrow protrusion 112 that encircles the through openings 110, encircles the central opening 120 and includes radial spokes disposed between the through openings 110 whereby the protrusion 112 has the appearance of a wheel when the first seal plate is viewed in bottom plan view. The annular protrusion 112 is narrow in a radial direction, and an end face 114 of the annular protrusion 112 cooperates and/or engages with the facing planar surface of the second subassembly 200 to form a fluid tight seal therewith.

The first plate diverter-facing surface 104 faces, and directly contacts, a corresponding base-facing surface 133 of the intervening first elastic element 132, as discussed in detail below.

The first plate peripheral surface 108 faces the sidewall 21. In the illustrated embodiment, the first peripheral surface 108 is circular when viewed in a direction parallel to the rotational axis 58 and includes three ribs 122. The ribs 122, which are rectangular protrusions, protrude from the first plate peripheral surface 108. The ribs 122 are spaced apart along the circumference of the first seal plate 102 and extend toward the sidewall 21. Each rib 122 is shaped and dimensioned to engage with a respective one of the diverter latches 70 that protrude from the diverter 60. A rib 122 is provided for each latch 70. Each rib 122 engages with a corresponding latch 70, whereby the first seal plate 102 is axially retained with respect to the diverter 60. The ribs 122 and latches 70 are positioned so that each of the diverter stays 76 engages with a respective surface of a first plate through opening 110, whereby the first seal plate 102 is prevented from rotating relative to the diverter 60.

The first plate base-facing surface 106 faces toward the second seal subassembly 200, and the end face 114 of the protrusion 112 directly contacts a facing surface 204 of the second seal subassembly 200. Since the first seal plate 102 rotates in concert with the diverter 60 relative to the second seal subassembly 200 during valve use, the protrusion 112 of the first plate base-facing surface 106 provides a dynamic sealing surface of the seal assembly 80. Because the seal between the first and second seal plates 102, 202 is dynamic (e.g., the seal is formed between two relatively moving parts), the first seal plate 102 is formed of a highly wear resistive material. For example, in some embodiments, the first seal plate 102 may be ceramic or stainless steel. In other embodiments, the first seal plate 102 may be a plastic such as Polyphenylene Sulfide (PPS).

The first seal plate 102 is a thin plate in that the axial dimension, or thickness, of the first seal plate 102 is less than the dimension of the first seal plate 102 in a direction perpendicular to the axial dimension (e.g., less than the diameter of the first seal plate 102). For example, in the illustrated embodiment, the diameter of the first seal plate 102 may be in a range of 10 times the first seal plate thickness to 20 times the first seal plate thickness.

The first elastic element 132 is an elastic member having a shape that when viewed in top plan view, mimics the shape of the first seal plate 102. The first elastic element 132 includes a circumferentially-extending first element outer portion 134, a circumferentially-extending first element inner portion 136, and first element struts 138 that radially extend between the first element outer portion 134 and the first element inner portion 136, giving the first elastic element 132 the appearance of a spoked wheel when viewed in a direction parallel to the rotational axis 58. The first elastic element 132 has first element through openings 140, which are defined between the first element outer and inner portions 134, 136 and each pair of adjacent first element struts 138. By this configuration, the first element through openings 140 are each generally circular sector shaped. Fluid passes through the first elastic element 132 in a direction that is parallel to the rotational axis 58. In the illustrated embodiment, the first elastic element 132 includes five first element through openings 140(1), 140(2), 140(3), 140(4), 140(5) that have the same arrangement as the first plate through openings 110 and when the first elastic element 132 is assembled with the first seal plate, the first element through openings 140(1), 140(2), 140(3), 140(4), 140(5) are axially aligned with respective first plate through openings 110(1), 110(2), 110(3), 110(4), 110(5).

The diverter-facing surface 135 of the first elastic element 132 faces toward, and directly contacts, the diverter base-facing surface 61. More particularly, the first elastic element 132 is partially received in the diverter channel 68 which is shaped and dimensioned to receive the first elastic element diverter-facing surface 135 and peripheral edges 139 in a clearance fit, for example a sliding fit. The engagement between the elastic element peripheral edges 139 and surfaces of the diverter channel 68 serves to prevent relative rotation of the first elastic element 132 relative to the diverter 60. Thus, both the first elastic element 132 and the first seal plate 102 are fixed relative to the valve body 20.

The first elastic element 132 has a greater elasticity than the first seal plate 102. In addition, the first elastic element 132 is formed of an elastic material that is compatible with the fluid that flows through the rotary disc valve 18 and meets the requirements for operating temperature and durability. For example, when the rotary disc valve 18 is used to control fluid in a vehicle coolant system, the first elastic element 132 is formed of an elastomer that is compatible with automotive coolant, such as ethylene propylene diene monomer (EPDM).

In the illustrated embodiment, the first element outer portion 134, the first element inner portion 136, and the first element struts 138 of the first elastic element 132 have a rectangular shaped cross-section. The softness and resilience of the first elastic element 132 may be further increased and/or optimized by providing the first element outer and inner portions 134, 136 and the first element struts 138 with an irregular cross-sectional shape. For example, in some embodiments, the first element outer and inner portions 134, 136 and the first element struts 138 may include a non-circular and non-rectangular cross-sectional shape.

The first elastic element 132 is thin in that the axial dimension, or thickness, of the first elastic element 132 is much less than the dimension of the first elastic element 132 in a direction perpendicular to the axial dimension (e.g., much less than the diameter of the first elastic element 132). For example, in the illustrated embodiment, the diameter of the first elastic element 132 may be in a range of 10 times the elastic element thickness to 20 times the elastic element thickness. However, the thickness of the first elastic element 132 is approximately equal to the thickness of the first seal plate 102. In addition, the diameter of the first elastic element 132 is slightly less than a diameter of the first seal plate 102.

The second seal subassembly 200 is an assembly of two sealing elements. In particular, the second seal subassembly 200 includes a second seal plate 202 that is disposed between the first seal subassembly 100 and the valve body 20, and a second elastic element 232 that is disposed between the second seal plate 202 and the valve body 20. The second seal plate 202 and the second elastic element 232 are stacked in a direction parallel to the rotational axis 58. When viewed in a direction parallel to the rotational axis 58, each of the second elastic element 232 and the second seal plate 202 have shape that is similar to that of the lid-facing surfaces of the valve body 20. The second elastic element 232 and the second seal plate 202 will now be described in detail.

The second seal plate 202 includes a second plate outer portion 201, a second plate mid portion 203 and a second plate inner portion 205. The second plate outer, mid and inner portions 201, 203, 205 are annular and radially spaced apart. The second plate outer, mid and inner portions 201, 203, 205 are arranged concentrically so as to be centered on the rotational axis 58 with the mid portion 203 being disposed between the outer and inner portions 201, 205. The second seal plate 202 includes second plate struts 209 that extend radially between the second plate outer portion 201 and the second plate inner portion 205, intersecting the second plate mid portion 203. The second plate inner portion 205 includes a central opening 207 configured to permit passage of the valve shaft 56 therethrough.

The second seal plate 202 has second plate through openings 210 that are defined between the plate outer and mid portions 201, 203 and each pair of adjacent second plate struts 209, and between the plate mid and inner portions 203, 205 and each pair of adjacent second plate struts 209. The second plate struts 209 are not equidistantly spaced, whereby the respective second plate through openings 210 do not each have the same arc length.

In the illustrated embodiment, there are five struts 209. As a result, second seal plate 202 includes ten through openings 210(1), 210(2), 210(3), 210(4), 210(5), 210(6), 210(7), 210(8), 210(9), 210(10). Five of the ten through openings, referred to as the "radially innermost through openings" (e.g., through openings 210(1), 210(4), 210(5), 210(8), 210(9)) are circular sector shaped and disposed between the mid portion 203 and the inner portion 205. The remaining through openings 210, referred to as the "radially outermost through openings" (e.g., through openings 210(2), 210(3), 210(6), 210(7), 210(10)) are disposed between the outer portion 201 and the mid portion 203. The radially outermost through openings 210(2), 210(3), 210(6), 210(7), 210(10) are each radially aligned with one of the radially innermost through openings 210(1), 210(4), 210(5), 210(8), 210(9), and have a truncated circular sector (e.g., arc) shape.

The second plate outer portion 201 has a second plate peripheral surface 308 that faces the sidewall 21. In the illustrated embodiment, the plate peripheral surface 308 is circular.

Each of the valve body stays 36 engages with a respective surface of a second plate through opening 210, whereby the second seal plate 202 is prevented from rotating relative to the valve body 20.

The second plate diverter-facing and base-facing surfaces 204, 206 are planar (e.g., flat or level and smooth, without raised areas, protrusions, recesses, indentations or surface features or irregularities). The diverter-facing surface 204 of the second seal plate 202 provides a portion of the dynamic seal of the seal assembly 80. In particular, the diverter-facing surface 204 faces toward, and directly contacts, the protrusion 112 of the first seal plate 102 of the first seal subassembly 100. Since the first seal subassembly 100 rotates in concert with the diverter 60 relative to the valve body 20 during valve use, the first seal plate 102 is rotatable relative to the second seal plate 202. For this reason, the second seal plate 202 is rigid, and is formed of a highly wear-resistive material. In some embodiments, for example, the second seal plate 202 may be ceramic or stainless steel. In other embodiments, the second seal plate 202 may be a plastic such as Polyoxymethylene (POM).

The second seal plate 202 is a thin plate in that the axial dimension, or thickness, of the second seal plate 202 is much less than the dimension of the second seal plate 202 in a direction perpendicular to the axial dimension (e.g., much less than the diameter of the second seal plate 202). For example, in the illustrated embodiment, the diameter of the second seal plate 202 may be in a range of 10 times the second seal plate thickness to 20 times the second seal plate thickness. However, the second seal plate 202 has approximately the same thickness as that of the first seal plate 102.

In the illustrated embodiment, the second elastic element 232 has the same profile as the second seal plate 202 when the second elastic element is viewed in a direction parallel to the rotational axis 58.

The second elastic element 232 includes a second element outer portion 231, a second element mid portion 233 and a second element inner portion 235. The second element outer, mid and inner portions 231, 233, 235 are annular and radially spaced apart. The second element outer, mid and inner portions 231, 233, 235 are arranged concentrically so as to be centered on the rotational axis 58 with the mid portion 233 being disposed between the outer and inner portions 231, 235. The second seal element 232 includes second element struts 239 that extend radially between the second element outer portion 231 and the second element inner portion 235, intersecting the second element mid portion 233. The second element inner portion 235 includes a central opening 237 configured to permit passage of the valve shaft 56 therethrough.

The second elastic element 232 has second element through openings 240 that are defined between the element outer and mid portions 201, 203 and each pair of adjacent second element struts 239, and between the element mid and inner portions 203, 205 and each pair of adjacent second element struts 239. The second element struts 239 are not equidistantly spaced, whereby the respective second element through openings 240 do not each have the same arc length.

In the illustrated embodiment, there are five struts 239. As a result, second seal element 202 includes ten through openings 240(1), 240(2), 240(3), 240(4), 240(5), 240(6), 240(7), 240(8), 240(9), 240(10). Five of the ten through openings, referred to as the "radially innermost through openings" (e.g., through openings 240(1), 240(4), 240(5), 240(8), 240(9)) are circular sector shaped and disposed between the element mid portion 203 and the element inner portion 205. The remaining through openings 240, referred to as the "radially outermost through openings" (e.g., through openings 240(2), 240(3), 240(6), 240(7), 240(10)) are disposed between the outer portion 201 and the mid portion 203. The radially outermost through openings 240 (2), 240(3), 240(6), 240(7), 240(10) are each radially aligned with one of the radially innermost through openings 240(1), 240(4), 240(5), 240(8), 240(9), and have a truncated circular sector (e.g., arc) shape.

The base-facing surface 236 of the second elastic element 232 faces toward and is received in the channel 28 provided in the valve body 20. More particularly, the second elastic element 232 rests in the channel 28 which is shaped and dimensioned to receive the elastic element base-facing surface 236 and peripheral edges 238 in a clearance fit, for example a sliding fit. The engagement between the elastic element peripheral edges 238 and surfaces of the channel 28 serves to prevent relative rotation of the second elastic element 232 relative to the valve body 20. Thus, both the second elastic element 232 and the second seal plate 202 are fixed relative to the valve body 20.

The second elastic element 232 has a greater elasticity than second seal plate 202. In addition, the second elastic element 232 is formed of an elastic material that is compatible with the fluid that flows through the rotary disc valve 18 and meets the requirements for operating temperature and durability. For example, when the rotary disc valve 18 is used to control fluid in a vehicle coolant system, the second elastic element 232 is formed of an elastomer that is compatible with automotive coolant, such as such as ethylene propylene diene monomer (EPDM).

In addition to material selection, the softness and resilience of the second elastic element 232 may be further increased and/or optimized by providing the second element outer, mid and inner portions 231, 233, 235 and the second element struts 239 with an irregular cross-sectional shape. For example, in some embodiments, the second element outer, mid and inner portions 231, 233, 235 and the second element struts 239 may include a non-circular and non-rectangular cross-sectional shape. In the illustrated embodiment, the second element outer, mid and inner portions 231, 233, 235 and the second element struts 239 each have rectangularly shaped cross-section.

The second elastic element 232 is thin in that the axial dimension, or thickness, of the second elastic element 232 is much less than the dimension of the second elastic element 232 in a direction perpendicular to the axial dimension (e.g., much less than the diameter of the second elastic element 232). For example, in the illustrated embodiment, the diameter of the second elastic element 232 may be in a range of 10 times the elastic element thickness to 20 times the elastic element thickness. However, the thickness of the second elastic element 232 is approximately the same as the thickness of the second seal plate 202, and the diameter of the second elastic element 232 is the same as a diameter of the second seal plate 202.

Referring to FIG. 4, the rotary disc valve 18 includes the spring 49 that is disposed between the lid 44 and the diverter 60. Like the previous embodiment, the spring 49 is under compression, whereby the spring 49 biases the diverter 60 toward the valve body base 26 and provides a sealing force to the seal assembly 80. In particular, the spring 49 pushes the diverter 60 toward the valve body base 26 with the seal assembly 80 disposed therebetween to facilitate a fluid-tight seal within the rotary disc valve 18 that consists of several static seals and a dynamic seal. In the illustrated embodiment, a fluid-tight first static seal is provided between the diverter base-facing surface 61 and the diverter-facing surface 135 of the first elastic element 132. A fluid-tight second static seal is provided between the base-facing surface 133 of the first elastic element 132 and the diverter-facing surface 104 of the first seal plate 102. A fluid-tight dynamic seal is provided between the base-facing surface 106 of the first seal plate 102 and the diverter-facing surface 204 of the second seal plate 202 (more particularly, between the protrusion 112 and the diverter-facing surface 204 of the second seal plate 202). A fluid tight third static seal is provided between the base-facing surface 206 of the second seal plate 202 and the diverter-facing surface 234 of the second elastic element 232. In addition, a fluid-tight fourth static seal is provided between the base-facing surface 236 of the second elastic element 232 and the valve body channel 28.

The first seal subassembly 100 abuts the diverter 60 so as to reside in the diverter channel 68 and has through openings 110, 140 that are aligned with the diverter through openings 63. The second seal subassembly 200 abuts the valve body 20 so as to reside in the valve body channel 28 and has through openings 210, 240 that are aligned with a corresponding subchamber 32 of the valve body 20. In certain rotational positions of the diverter 60 relative to the valve body 20, a subset of the first and second seal subassembly through openings 110, 140 and 210, 240 are aligned with each other providing flow paths between the diverter 60 and the valve body 20.

While the first seal subassembly 100 prevents fluid flow between the seal assembly 80 and the diverter 60 and the second seal subassembly 200 prevents fluid flow between the seal assembly 80 and the valve body 20, the dynamic seal is provided between abutting portions of the first and second seal subassemblies 100, 200. The dynamic seal prevents fluid flow between contacting surfaces of the first and second seal subassemblies 100, 200, and retains fluid within the through openings 110, 140, 210, 240 of the seal assembly 80.

In the rotary disc valve 18, the diverter 60 is configured to control fluid flow through the valve body 20 in such a way that fluid enters the valve body 20 via one or more ports 33, passes through the respective subchambers 32 which direct the fluid to the diverter 60 via the seal assembly 80. The path through the diverter 60 is dependent upon the rotational orientation of the diverter 60 with respect to the valve body 20, as discussed below. Fluid exits the diverter 60 and is directed to the valve body 20 via the seal assembly 80 where the fluid exits the valve 18 via a different port 33 relative to the one it entered.

As previously described, the diverter 60 includes the domes 65 that protrude from the diverter outer surface 62 and overlie each of the diverter through openings 63(1), 63(2), 63(3), 63(4), 63(5), providing a portion of an enclosed fluid passageway within the rotary disc valve 18. The first through fourth domes 65(1), 65(2), 65(3), 65(4) corresponding to the respective first through fourth diverter openings 63(1), 63(2), 63(3), 63(4) having the relatively longer radial dimension as compared to that of the fifth diverter through opening 63(5) are configured to divert fluid in a radial direction. In addition, the fifth dome 65(5) and the diverter cut out 64 (which provides a portion of an "open" fluid passageway) permit fluid flow in a circumferential direction.

The rotary disc valve 18 may be operated in four modes, each mode corresponding to a unique rotational orientation of the diverter 60 with respect to the valve body 20. The four operating modes will now be described in detail.

Referring to FIGS. 15A and 15B, the first operating mode corresponds to a first rotational orientation of the diverter 60 with respect to the valve body 20. In the first operating mode, the first dome 65(1) is axially aligned with the first and third subchambers 32(1), 32(3), the second dome 65(2) is axially aligned with the second and fourth subchambers 32(2), 32(4), the third dome 65(3) is axially aligned with the seventh and fifth subchambers 32(7), 32(5), the fourth dome 65(4) is axially aligned with the sixth and eighth subchambers 32(6), 32(8), the fifth dome 65(5) is axially aligned the non-working subchamber 32(9) and the cut out 64 is axially aligned with the non-working subchamber 32(10).

In the first operating mode, the first and third ports 33(1), 33(3) are in fluid communication via a radial flow path through the diverter 60 as provided by the first dome 65(1), the second and fourth ports 33(2), 33(4) are in fluid communication via a radial flow path through the diverter 60 as provided by the second dome 65(2), the fifth and seventh ports 33(5), 33(7) are in fluid communication via a radial flow path through the diverter 60 as provided by the third dome 65(3) and the sixth and eighth ports 33(6), 33(8) are in fluid communication via a radial flow path through the diverter 60 as provided by the fourth dome 65(4). The fifth dome 65(5) and the cut out 64 provide no fluid path while the valve 18 is in the first operating mode.

Referring to FIGS. 16A and 16B, the second operating mode corresponds to a second rotational orientation of the diverter 60 with respect to the valve body 20. In the second operating mode, the first dome 65(1) is axially aligned with the fifth and seventh subchambers 32(5), 32(7), the second dome 65(2) is axially aligned with the sixth and eighth subchambers 32(6), 32(8), the third and fourth domes 65(3), 65(4) are axially aligned with the non-working subchambers 32(9), 32(10) and the fifth dome 65(5) and the cut out 64 are axially aligned with the first through fourth subchambers 32(1), 32(2), 32(3), 32(4).

In the second operating mode, the first and fourth ports 33(1), 33(4) are in fluid communication via a circumferential flow path through the diverter 60 as provided by the fifth dome 65(5), the second and third ports 33(2), 33(3) are in fluid communication via a circumferential flow path as provided by the cut out 64, the fifth and seventh ports 33(5), 33(7) are in fluid communication via a radial flow path through the diverter 60 as provided by the first dome 65(1) and the sixth and eighth ports 33(6), 33(8) are in fluid communication via a radial flow path through the diverter 60 as provided by the second dome 65(2).

Referring to FIGS. 17A and 17B, the third operating mode corresponds to a third rotational orientation of the diverter 60 with respect to the valve body 20. In the third operating mode, the first dome 65(1) is axially aligned with the sixth and eighth subchambers 32(6), 32(8), the second and third domes 65(2), 65(3) are axially aligned with the non-working subchambers 32(9), 32(10), the fourth dome 65(4) is axially aligned with the first and third subchambers 32(1), 32(3) and the fifth dome 65(5) and the cut out 64 are axially aligned with the second, fourth, fifth and seventh subchambers 32(2), 32(4), 32(5), 32(7).

In the third operating mode, the first and third ports 33(1), 33(3) are in fluid communication via a radial flow path through the diverter 60 as provided by the fourth dome 65(4), the second and seventh ports 33(2), 33(7) are in fluid communication via a circumferential flow path as provided by the cut out 64, the fourth and fifth ports 33(4), 33(6) are in fluid communication via a circumferential flow path through the diverter 60 as provided by the fifth dome 65(5) and the sixth and eighth ports 33(6), 33(8) are in fluid communication via a radial flow path through the diverter 60 as provided by the first dome 65(1).

Referring to FIGS. 18A and 18B, the fourth operating mode corresponds to a fourth rotational orientation of the diverter 60 with respect to the valve body 20. In the fourth operating mode, the first and second domes 65(1), 65(2) are axially aligned with the non-working subchambers 32(9), 32(10), the third dome 65(3) is axially aligned with the first and third subchambers 32(1), 32(3), and the fourth dome 65(4) is axially aligned with the second and fourth subchambers 32(2), 32(3) and the fifth dome 65(5) and the cut out 64 are axially aligned with the fifth, sixth, seventh and eighth subchambers 32(5), 32(6), 32(7), 32(8).

In the fourth operating mode, the first and third ports 33(1), 33(3) are in fluid communication via a radial flow path through the diverter 60 as provided by the third dome 65(3), the second and fourth ports 33(2), 33(4) are in fluid communication via a radial flow path as provided by the fourth dome 65(4), the fifth and eighth ports 33(5), 33(8) are in fluid communication via a circumferential flow path through the diverter 60 as provided by the fifth dome 65(5) and the sixth and seventh ports 33(6), 33(7) are in fluid communication via a circumferential flow path as provided by the cutout 64.

Figure 19:
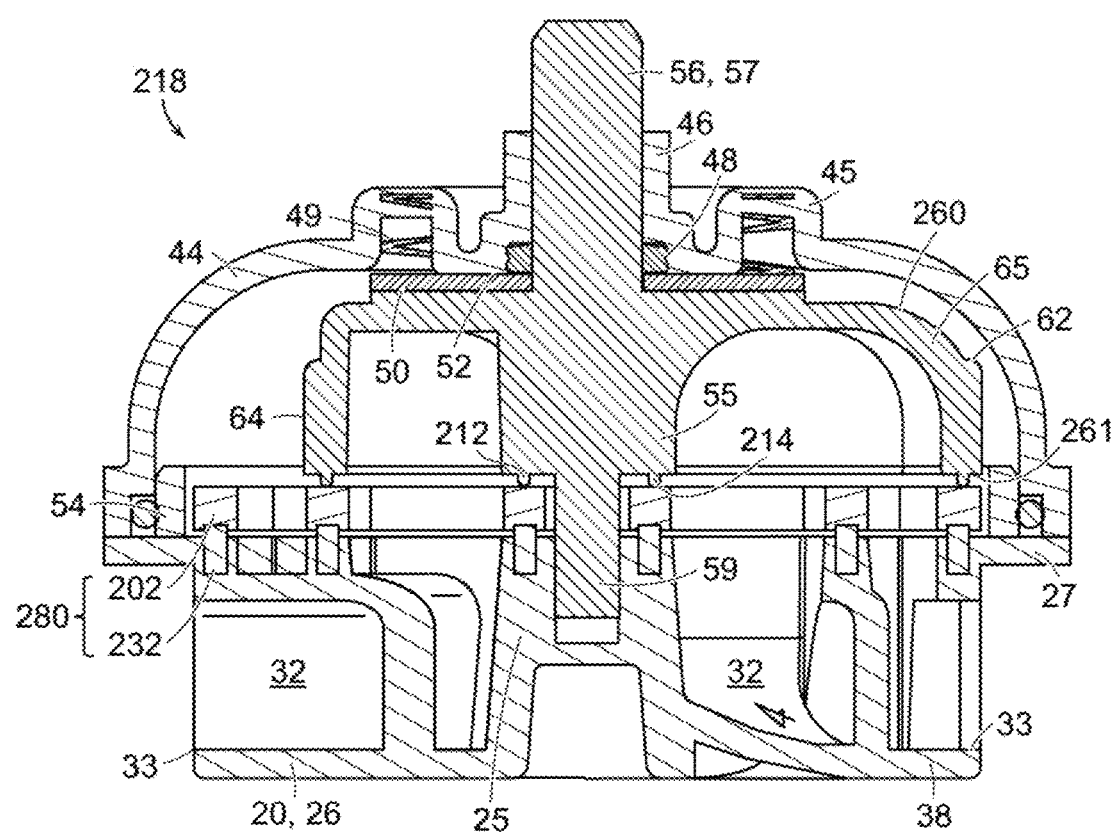
FIG. 19 is a cross-sectional view of an alternative embodiment rotary disc valve.
Figure 20:
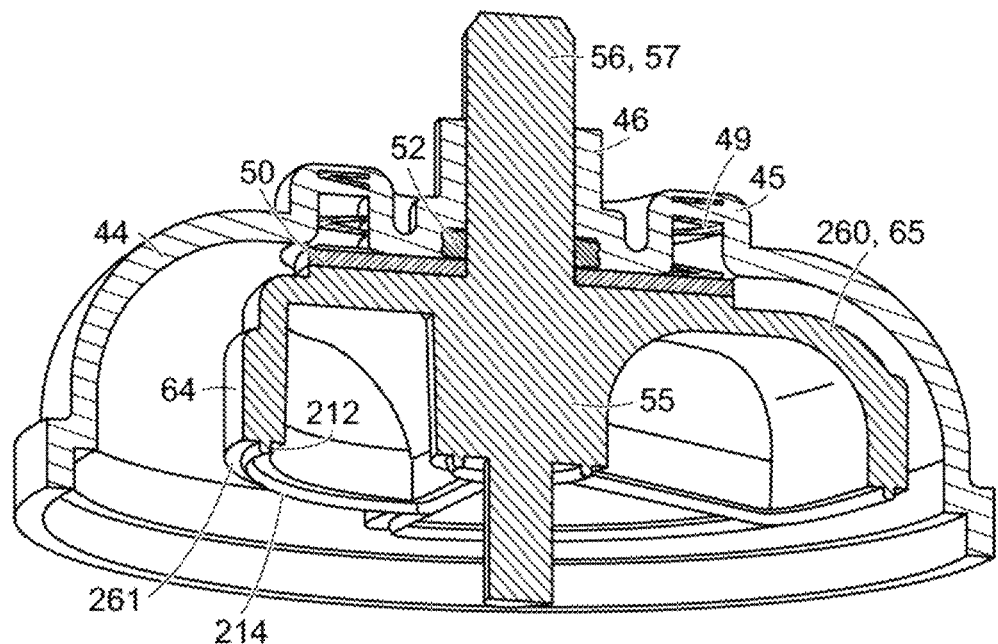
FIG. 20 is a perspective cross-sectional view of the rotary disc valve of FIG. 19 with the valve body and seal assembly omitted.

Referring to FIGS. 19 and 20, an alternative embodiment rotary disc valve 218 is similar to the rotary disc valve 18 described above with respect to FIGS. 1-18, and common reference numbers are used to identify common elements. For example, the rotary disc valve 218 is a type of directional control valve that may be used in the fluid delivery system 1 to control fluid flow and distribution through the system 1 and includes the valve body 20, the lid 44, the lid seal 56, the shaft seal 54 and the lid spring 49 as previously described. The rotary disc valve 218 of FIGS. 19 and 20 differs from the previous embodiment in that it omits the dynamic seal between two seal subassemblies. To that end, the rotary disc valve 218 includes an alternative embodiment diverter 260 and an alternative embodiment seal assembly 280, each disposed in the valve chamber 29.

The alternative embodiment seal assembly 280 is identical to the second seal subassembly 200 described above and the first seal subassembly is omitted.

The diverter 260 is similar to the diverter 60 described above with respect to FIGS. 12 and 13, except that the first seal plate 102 is made integral with the base-facing surface 61. Thus, the base-facing surface 261 of the diverter 260 provides a portion of the dynamic seal, as discussed below.

The diverter 260 is rotatable relative to the valve body 20 about the rotational axis 58. The diverter 260 is a flat plate having an irregular peripheral shape and includes a base-facing surface 261 that faces toward the base 26, and a lid-facing surface 62 that is opposed to the diverter base-facing surface 261. Although generally circular, the diverter 260 has an arc-shaped cut out 64 along a periphery of a sector of the diverter 260.

The diverter 260 includes the valve shaft 56 that protrudes from the center of the diverter outer surface 62 in a direction that is substantially perpendicular to the diverter base-facing surface 261. The diverter 260 includes the diverter through openings 63 having a circular sector-shaped profile when the diverter 260 is viewed in a direction parallel to the rotational axis 58 as previously described. The diverter 260 includes domes 65 that protrude from the diverter outer surface 62 and overlie each of the diverter through openings 63(1), 63(2), 63(3), 63(4), 63(5) as previously described.

The diverter base-facing surface 261, which includes an end face of the boss 55, faces a corresponding diverter-facing surface 135 of the seal assembly 80. The diverter base-facing surface 261 is generally planar. Due to the size and shape of the diverter through openings 63, the diverter base-facing surface 261 has the appearance of a wagon wheel including spokes and a hub when viewed in bottom plan view. In the illustrated embodiment, the diverter base-facing surface 261 includes a narrow protrusion 212 that encircles the through openings 63, encircles the shaft 56 and includes radial spokes disposed between the through openings 63 whereby the protrusion 212 has the appearance of a wheel when the first seal plate is viewed in bottom plan view. The annular protrusion 212 is narrow in a radial direction, and an end face 214 of the annular protrusion 212 cooperates and/or engages with the facing planar surface 204 of the seal plate 232 of the seal assembly 280 to form a fluid tight dynamic seal therewith.

The diverter 260 and the first and second seal plates 102, 202 may be formed of plastic, ceramic, stainless steel or other material having sufficient rigidity and wearability. For example, in the illustrated embodiment, the diverter 260 is formed of a plastic such as Polyphenylene Sulfide (PPS).

The rotary disc valve 18 described above with respect to FIGS. 1-18 is exemplified by a dynamic seal between the first and second seal plates 102, 202 whereas the rotary disc valve 218 described in FIGS. 19 and 20 is exemplified by a dynamic seal between the diverter 260 and the seal plate 202 of the seal assembly 280.

Figure 21:
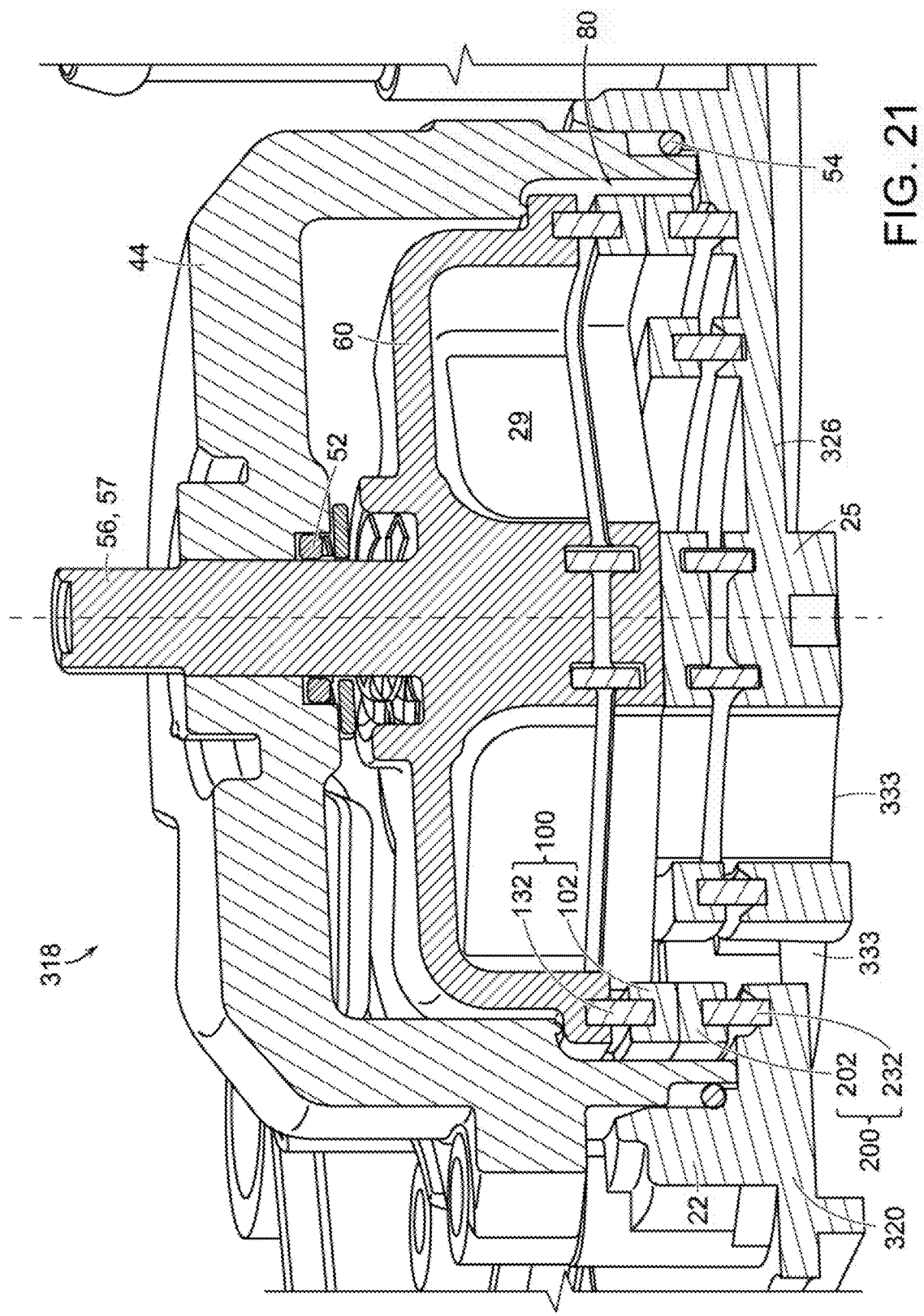
FIG. 21 is a cross-sectional view of another alternative embodiment rotary disc valve.
Figure 22:
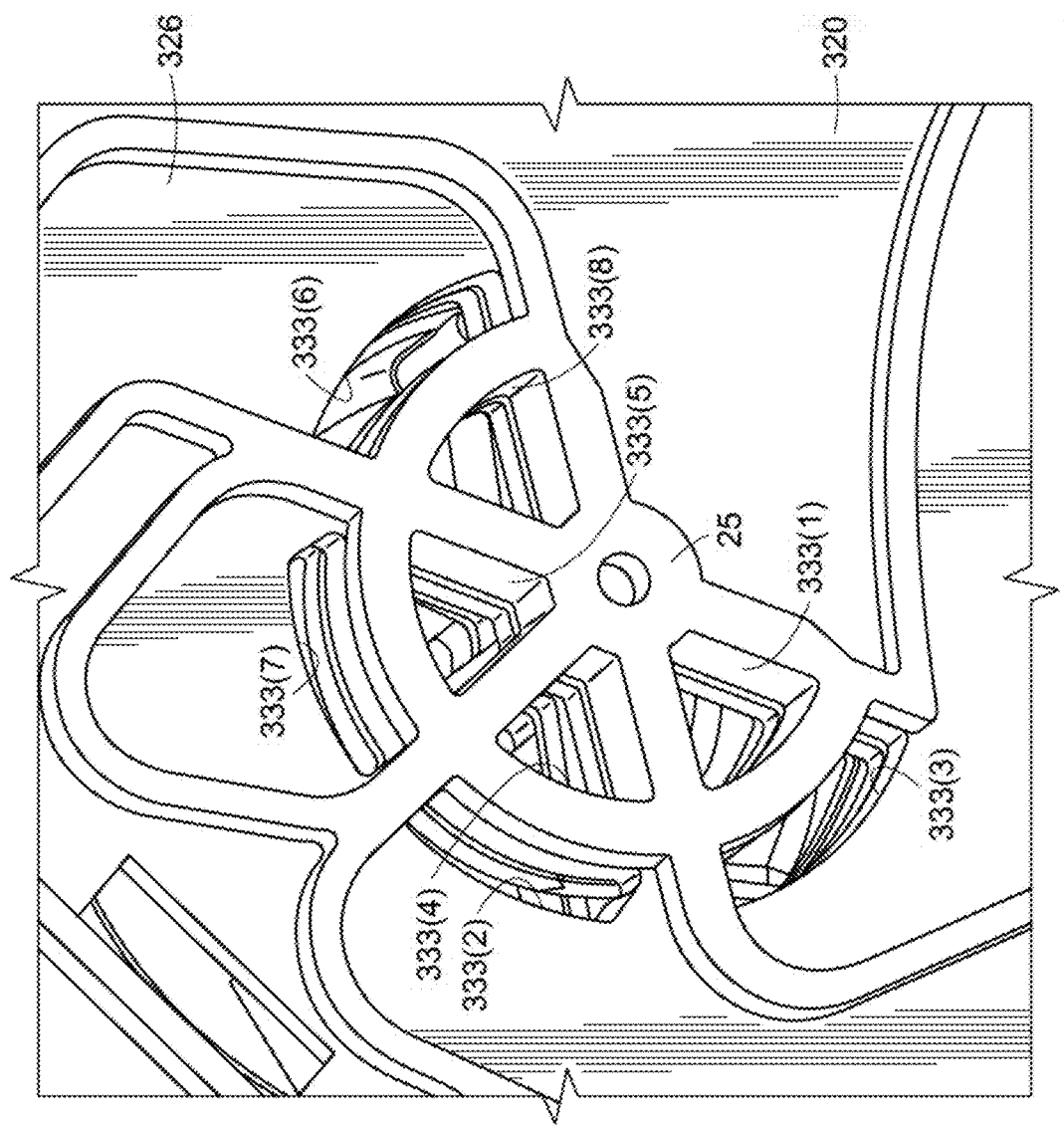
FIG. 22 is a bottom view of the alternative embodiment rotary disc valve of FIG. 21.
Figure 23:
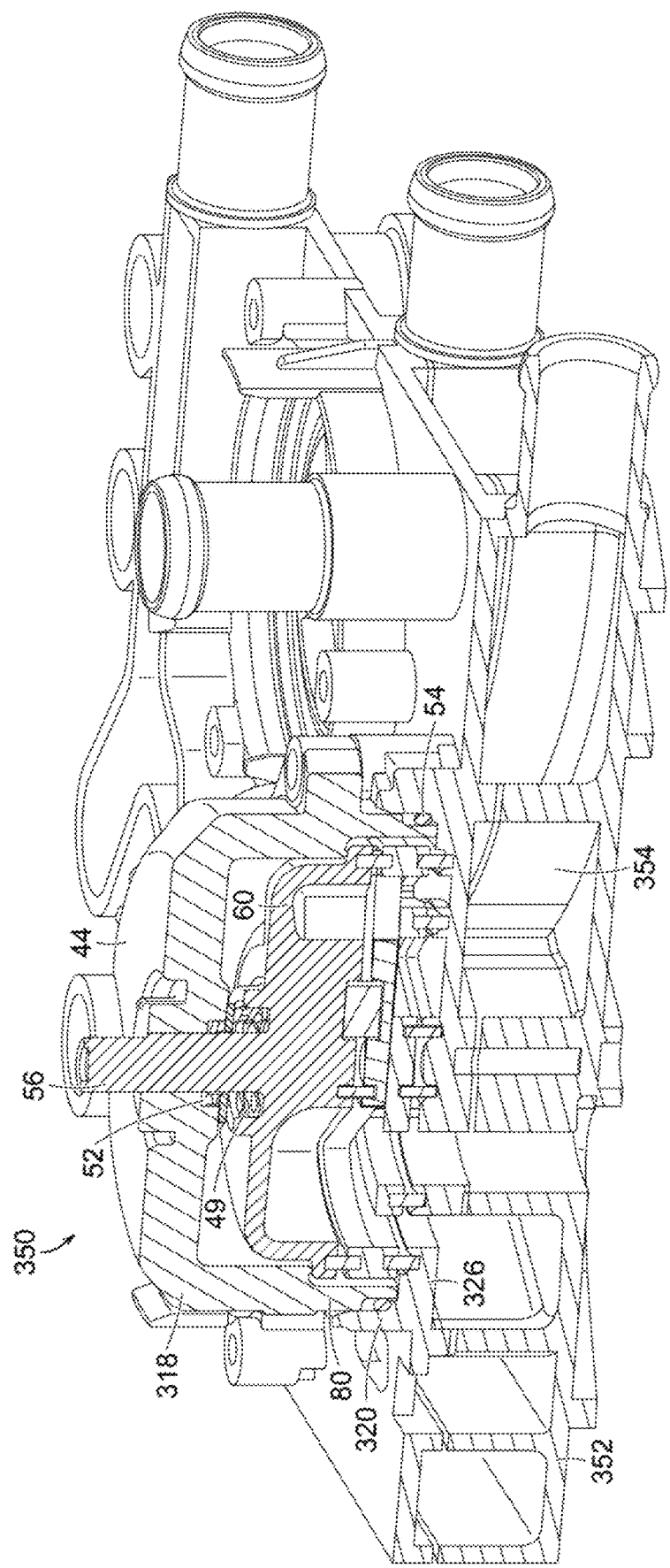
FIG. 23 is a perspective view of thermal control module including the alternative embodiment rotary disc valve of FIG. 21.

Referring to FIGS. 21-23, an alternative embodiment rotary disc valve 318 is similar to the rotary disc valve 18 described above with respect to FIGS. 1-18, and common reference numbers are used to identify common elements. For example, the rotary disc valve 318 is a type of directional control valve that is integrated into a module housing 352 of a thermal control module 350 and may be used in the fluid delivery system 1 to control fluid flow and distribution through the system 1. As in previous embodiments, the rotary disc valve 318 includes the lid 44, the lid seal 56, the shaft seal 54, the seal assembly 80 and the lid spring 49 as previously described. The rotary disc valve 318 of FIGS. 21-23 differs from the previous embodiments in that the valve body is configured to be integrated into the module housing 352. To that end, the rotary disc valve 318 includes an alternative embodiment valve body 320. The valve body 320 of the rotary disc valve 318 is similar to the valve body 20 described above, and common reference numbers are used to identify common elements.

The valve body 320 differs from the previous embodiments with respect to the arrangement of the valve ports 333. Each of the valve ports 333 corresponds to an opening in the valve body base 326 and communicates with a corresponding one of the subchambers 32.

Specifically, the radially innermost working subchambers 32(1), 32(4), 32(5), 32(8) and the radially outermost working subchambers 32(2), 32(3), 32(6), 32(7) each adjoin the base 326, and each valve port 333(1), 333(2), 333(3), 333(4), 333(5), 333(6), 333(7), 333(8) directly communicates with a respective one of the subchambers 32, where the term "directly" refers to a lack of intermediate structures such as fluid passageways. Fluid exiting the valve body 320 exits the respective valve port 333 along a linear path that is parallel to the valve rotational axis 58 and is received within a manifold 354 that is defined within the module housing 352 and adjoins the base 326 of the valve body 320. The valve ports 333 have the same arrangement with respect to the seal assembly 80 and diverter 60 as described in the previous embodiments.

There may be additional variants of the valve body 320. For example, in some embodiments, each of the radially innermost working subchambers 32(1), 32(4), 32(5), 32(8) adjoins the base 326 and is in fluid communication with a respective valve port 333 provided in the base 326, while each of the radially outermost working subchambers 32(2), 32(3), 32(6), 32(7) adjoins the valve body sidewall 21 and is in direct communication with a respective valve port 333 provided in the valve body sidewall 21.

Figure 24:
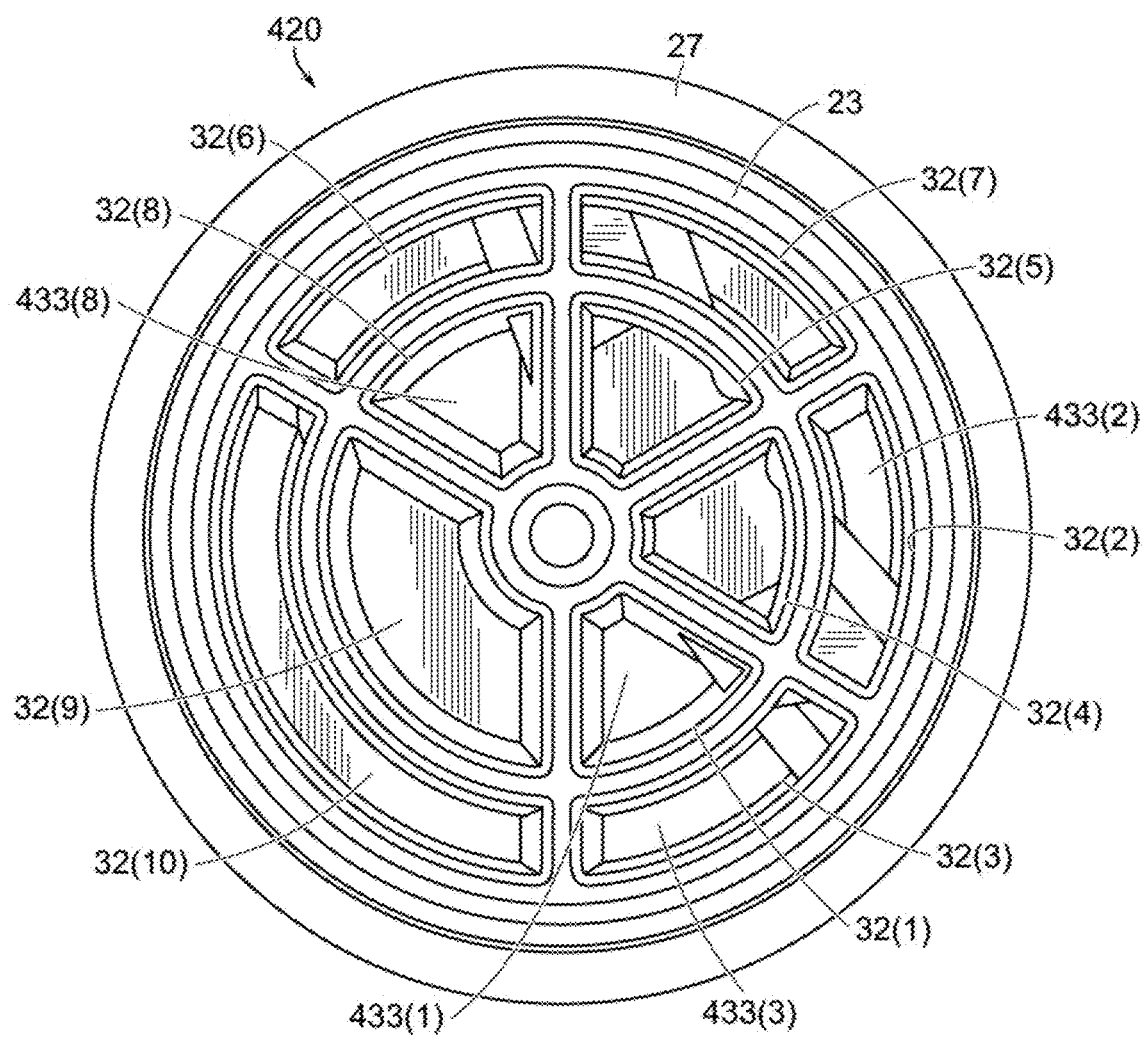
FIG. 24 is a is a top plan view of an alternative embodiment valve body.
Figure 25:
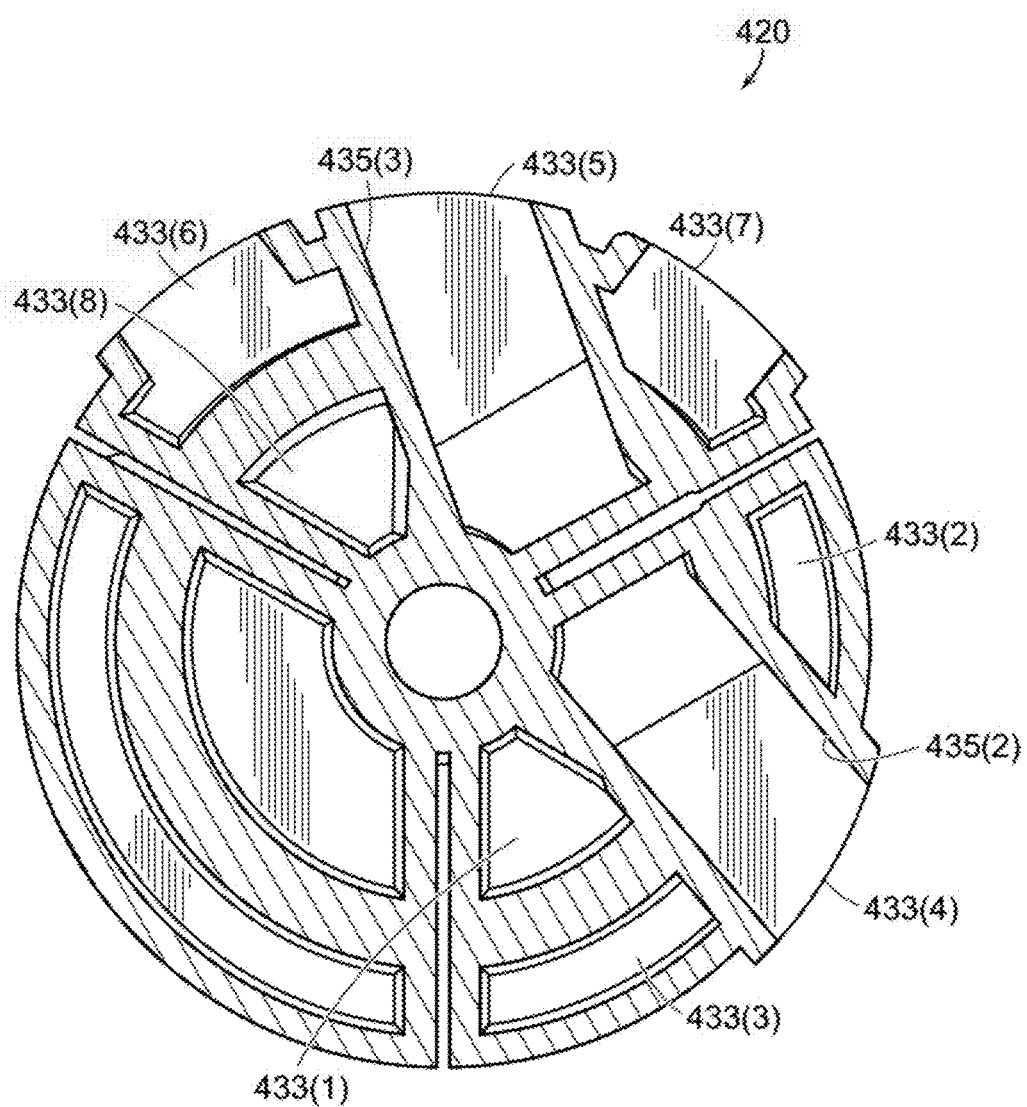
FIG. 25 is a cross-sectional view of the valve body of FIG. 24 as seen along line 25-25 of FIG. 26.
Figure 26:
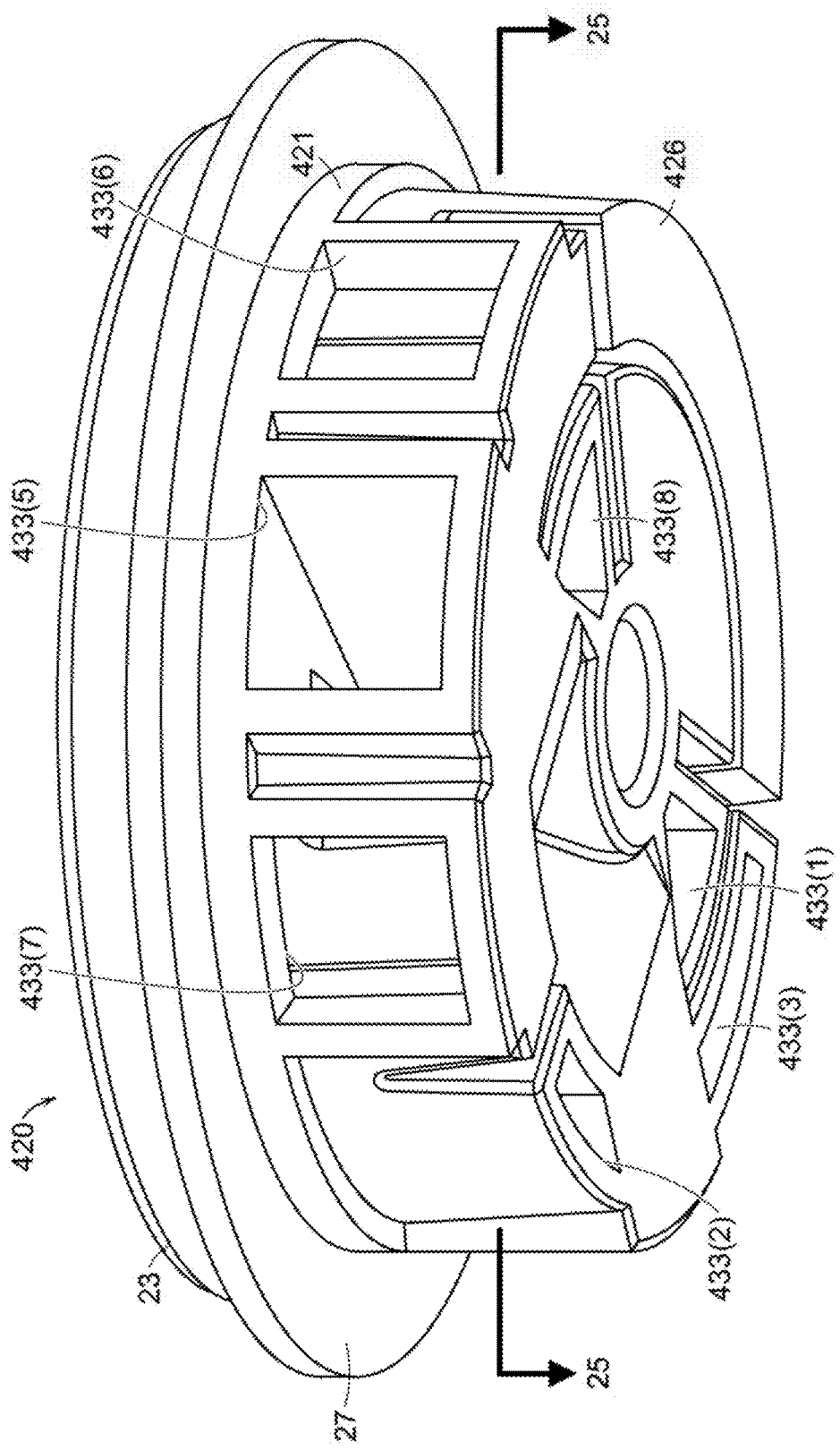
FIG. 26 is a bottom perspective view of the valve body of FIG. 24.

In other embodiments, any subchamber 32 may communicate with a port 333 provided in either the valve body sidewall 21 or the base 326, depending on the valve packaging requirements of the specific application. For example, with reference to FIGS. 24-26, in the alternative embodiment valve body 420, two of the radially innermost working subchambers 32(1), 32(8) and two of the radially outermost working subchambers 32(2), 32(3) each adjoin the base 426 and directly communicate with a respective valve port 433(1), 433(2), 433(3), 433(8) that opens through the valve body base 426. Fluid exits these valve ports 433(1), 433(2), 433(3), 433(8) in an axial direction. In addition, the other two of the radially innermost working subchambers 32(4), 32(5) and the other two of the radially outermost working subchambers 32(6), 32(7) each communicate with a respective valve port 433(4), 433(5), 433(6), 433(7) that opens through the valve body sidewall 421. Fluid exits the valve ports 433(6), 433(7) of the radially outermost working subchambers 32(6), 32(7) in a radial direction. In this example, the radially innermost working subchambers 32(4), 32(5) communicate with their respective valve port 433(4), 433(5) via a respective base fluid passageway 435(2), 435(3). Each of the base fluid passageways 435(2), 435(3) extends along a linear path that is non-radial with respect to the valve rotational axis 58. The valve ports 433 have the same arrangement with respect to the seal assembly 80 and diverter 60 as described in the previous embodiments.

In each of the illustrated embodiments, a lid 44 is provided that closes the open end of the valve body 20. However, in other embodiments (not shown), the lid 44 may be omitted and the open end of the valve body 20 may be closed by a housing of the valve actuator, a portion of a module housing or other ancillary structure.

In each of the illustrated embodiments, the valve body 20 includes a central plain bearing 25 that protrudes from the base 26 toward the sidewall open end 23. The plain bearing 25 receives the valve shaft second portion 59 protrudes from the base-facing surface 61 of the diverter 60. However, in some embodiments, the rotary disc valve may include a valve body 20 in which the valve shaft second portion 59 and the plain bearing 25 are omitted.

In each of the illustrated embodiments, the spring 49 biases the diverter 60 toward the valve body base 26 and provides a sealing force to the seal assembly 80. However, in other embodiments, the rotary disc valve may include a valve body 20 in which the spring 49 is omitted. In the latter case, an interference fit between the lid 44 and the diverter 60 may provide the axial force on the seal assembly 80. The spring-free configuration may be also employed in some embodiments in which the valve shaft second portion 59 and the plain bearing 25 are omitted.

In each of the illustrated embodiments, the working subchambers 32(1), 32(2), 32(3), 32(4), 32(5), 32(6), 32(7), 32(8) of the valve body 20 have an arc length l1 in a range of 30 degrees to 60 degrees and the remaining subchambers 32(9), 32(10) have an arc length l2 in a range of 120 degrees to 240 degrees. However, the valve body 20 is not limited to this configuration. For example, in other embodiments, the arc lengths l1 and l2 of the working subchambers and the non-working subchambers may be the same.

In each of the illustrated embodiments, the working subchambers 32(1), 32(2), 32(3), 32(4), 32(5), 32(6), 32(7), 32(8) of the valve body 20 are in fluid communication with a corresponding one of the valve ports 33(1), 33(2), 33(3), 33(4), 33(5), 33(6), 33(7), 33(8) and the remaining subchambers 32(9), 32(10) are not in fluid communication with a valve port. However, in some embodiments, the valve body 20 includes an equal number of valve ports 33 and subchambers 32, and each subchambers 32 is in fluid communication with a corresponding valve port 33.

Selective illustrative embodiments of the fluid delivery system including the rotary disc valve are described above in some detail. It should be understood that only structures considered necessary for clarifying the fluid delivery system and the rotary disc valve have been described herein. Other conventional structures, and those of ancillary and auxiliary components of the fluid delivery system and the rotary disc valve, are assumed to be known and understood by those skilled in the art. Moreover, while a working example of the fluid delivery system and the rotary disc valve have been described above, the fluid delivery system and the rotary disc valve are not limited to the working example described above, but various design alterations may be carried out without departing from the fluid delivery system and/or the rotary disc valve as set forth in the claims.

The invention claimed is:

1. A valve comprising: a valve housing, the valve housing including an inner surface that defines a chamber, chamber walls that segregate the chamber into subchambers that provide a portion of a fluid path through the valve housing, and valve ports, each valve port communicating with the chamber; a diverter disposed in the chamber, the diverter having a diverter outer diameter and being configured to control fluid flow through the valve housing, the diverter including a shaft that extends through an opening in the valve housing, the shaft being rotatable about a rotational axis; and a seal assembly disposed in the chamber so as to be aligned along the rotational axis with the diverter, the seal assembly configured to provide a fluid-tight seal between the diverter and the valve housing, wherein in at least one rotational orientation of the diverter with respect to the valve housing, the diverter is configured to a) divert fluid flow circumferentially along a first circumferential fluid path portion between a first subchamber disposed between the rotational axis and the sidewall and a second subchamber disposed between the rotational axis and the sidewall, and b) divert fluid flow circumferentially along a second circumferential fluid path portion between a third subchamber disposed between the rotational axis and the sidewall and a fourth subchamber disposed between the rotational axis and the sidewall; wherein the first circumferential fluid path portion and the second circumferential fluid flow path portion are concentric.

2. The valve of claim 1,
the second circumferential fluid path portion is disposed radially outward with respect to the first circumferential fluid path portion, and
the first circumferential fluid path portion and the second circumferential fluid path portion reside within an area circumscribed by the diverter outer diameter.

3. The valve of claim 1, wherein in the at least one rotational orientation of the diverter with respect to the valve housing, the diverter is configured to divert fluid flow radially along a first radial fluid path portion between a fifth subchamber disposed between the rotational axis and the sidewall and a sixth subchamber disposed between the rotational axis and the sidewall.

4. The valve of claim 1, wherein the diverter includes a dome that encloses the first circumferential fluid path portion, and the dome does not enclose the second circumferential fluid path portion.

5. The valve of claim 1, wherein the diverter comprises:
a diverter body having a sealing side and an outer side that is opposite the sealing side;
a shaft that protrudes from the outer side and extends through an opening in the valve housing;
through openings that extend between the sealing side and the outer side; and
domes that protrude from the outer side, each dome enclosing a unique one of the through openings.

6. The valve of claim 1, wherein the diverter comprises:
a diverter body having a sealing side and an outer side that is opposite the sealing side;
a shaft that protrudes from the outer side and extends through an opening in the valve housing; and
through openings that extend between the sealing side and the outer side;
wherein at least one through opening is arc shaped and has a first radius, and
at least one through opening is circular sector shaped and has a second radius, where the second radius is less than the first radius.

7. The valve of claim 1, wherein
the seal assembly comprises a first seal plate and a second seal plate,
the first seal plate includes a first plate sealing surface,
the second seal plate includes a second plate sealing surface that abuts and forms a fluid-tight seal with the first plate sealing surface,
one of the first plate sealing surface and the second plate sealing surface comprises a planar surface, and
the other of the first plate sealing surface and the second plate sealing surface comprises an annular protrusion and an end face of the annular protrusion cooperates with the planar surface to form the fluid tight seal.

8. The valve of claim 7, wherein the first seal plate is a disc-shaped plate that is fixed relative to the diverter, the second seal plate is a disc-shaped plate that is fixed relative to the base, whereby the first seal plate is rotatable relative to the second seal plate.

9. The valve of claim 1, wherein
the diverter is rotatable relative to the seal assembly,
a base-facing surface of the diverter defines a diverter sealing surface,
the seal assembly is stacked with respect to the diverter in a direction parallel to the rotational axis, and there being no intervening structures between the seal assembly and diverter sealing surface,
the seal assembly abuts the base and is fixed relative to the base,
the seal assembly includes a seal plate that is disposed between the base and the diverter, and an elastic element that is disposed between the base and the seal plate, and
a fluid tight seal exists at the interface between the seal plate and the diverter sealing surface.

10. The valve of claim 1, wherein
the subchambers comprise a first subchamber that resides between the rotational axis and the sidewall, and a second subchamber that resides between the first subchamber and the sidewall.

11. The valve of claim 1, wherein each valve port communicates with a unique subchamber.

12. The valve of claim 11, wherein
the chamber walls include base wall portions that protrude from the base, a first subset of the base wall portions joins the first subchamber to a respective valve port of the first subchamber, and the first subset of the base wall portions defines a linear fluid passageway that is non radial with respect to the rotational axis.

13. The valve of claim 12, wherein a second subset of the base wall portions joins the third subchamber to a respective valve port of the third subchamber, and the second subset of the base wall portions defines a linear fluid passageway that is radial with respect to the rotational axis.

14. The valve of claim 1, wherein a height of the sidewall is less than a diameter of the sidewall.

15. The valve of claim 1, wherein the lid has a central opening through which a shaft of the diverter extends, the lid includes a shaft seal that prevents fluid leakage between the shaft and the central opening, and the lid includes lid seal that prevents fluid leakage between the lid and the valve body.

16. A fluid delivery system comprising: a pump, and a rotary disc valve connected to the pump via a fluid line, the rotary disc valve including a valve housing, the valve housing including an inner surface that defines a chamber, chamber walls that segregate the chamber into subchambers that provide a portion of a fluid path through the valve housing, and valve ports, each valve port communicating with the chamber; a diverter disposed in the chamber, the diverter having a diverter outer diameter and being configured to control fluid flow through the valve housing, the diverter including a shaft that extends through an opening in the valve housing, the shaft being rotatable about a rotational axis; and a seal assembly disposed in the chamber so as to be aligned along the rotational axis with the diverter, the seal assembly configured to provide a fluid-tight seal between the diverter and the valve housing, wherein in at least one rotational orientation of the diverter with respect to the valve housing, the diverter is configured to a) divert fluid flow circumferentially along a first circumferential fluid path portion between a first subchamber disposed between the rotational axis and the sidewall and a second subchamber disposed between the rotational axis and the sidewall, and b) divert fluid flow circumferentially along a second circumferential fluid path portion between a third subchamber disposed between the rotational axis and the sidewall and a fourth subchamber disposed between the rotational axis and the sidewall; wherein the first circumferential fluid path portion and the second circumferential fluid flow path portion are concentric.

17. The valve of claim 16, the second circumferential fluid path portion is disposed radially outward with respect to the first circumferential fluid path portion, and the first circumferential fluid path portion and the second circumferential fluid path portion reside within an area circumscribed by the diverter outer diameter.

18. The valve of claim 16, wherein the diverter includes a dome that encloses the first circumferential fluid path portion, and the second circumferential fluid path portion is free of enclosure by a dome of the diverter.

19. The valve of claim 16, wherein the diverter comprises:

a diverter body having a sealing side and an outer side that is opposite the sealing side;

a shaft that protrudes from the outer side and extends through an opening in the valve housing;

through openings that extend between the sealing side and the outer side;

domes that protrude from the outer side, each dome enclosing a unique one of the through openings.

20. The valve of claim 16, wherein the diverter comprises:

a diverter plate having a sealing side and an outer side that is opposite the sealing side;

a shaft that protrudes from the outer side and extends through an opening in the valve housing; and through openings that extend between the sealing side and the outer side;

wherein at least one through opening is sector-shaped and has a first radius, and at least one through opening is sector shaped and has a second radius, where the second radius is less than the first radius.

* * * * *